(12) United States Patent
Kelley

(10) Patent No.: US 8,972,299 B2
(45) Date of Patent: Mar. 3, 2015

(54) METHODS FOR BIOMETRICALLY IDENTIFYING A PLAYER

(75) Inventor: Bryan M. Kelley, Alamo, CA (US)

(73) Assignee: Bally Gaming, Inc., Las Vegas, NV (US)

( * ) Notice: Subject to any disclaimer, the term of this patent is extended or adjusted under 35 U.S.C. 154(b) by 1287 days.

(21) Appl. No.: 12/350,190

(22) Filed: Jan. 7, 2009

(65) Prior Publication Data

US 2009/0176566 A1    Jul. 9, 2009

Related U.S. Application Data

(60) Provisional application No. 61/019,473, filed on Jan. 7, 2008.

(51) Int. Cl.
G06F 21/00 (2013.01)
G07F 17/32 (2006.01)

(52) U.S. Cl.
CPC ............ *G07F 17/3206* (2013.01); *G07F 17/32* (2013.01)
USPC .......................................................... 705/51

(58) Field of Classification Search
USPC .............. 705/51, 16, 21, 59, 71; 380/44, 262, 380/278, 279
See application file for complete search history.

(56) References Cited

U.S. PATENT DOCUMENTS

| | | | |
|---|---|---|---|
| 6,612,928 B1 | 9/2003 | Bradford et al. | |
| 7,004,389 B1* | 2/2006 | Robinson et al. | 235/382 |
| 7,175,528 B1 | 2/2007 | Cumbers | |
| 7,515,738 B1* | 4/2009 | Moritz | 382/115 |
| 7,577,847 B2 | 8/2009 | Nguyen et al. | |
| 8,057,298 B2 | 11/2011 | Nguyen et al. | |
| 2002/0103024 A1 | 8/2002 | Jeffway, Jr. et al. | |
| 2003/0064798 A1 | 4/2003 | Grauzer et al. | |
| 2004/0009809 A1 | 1/2004 | Salerno | |
| 2005/0181870 A1 | 8/2005 | Nguyen et al. | |
| 2005/0261058 A1* | 11/2005 | Nguyen et al. | 463/40 |
| 2006/0211493 A1* | 9/2006 | Walker et al. | 463/29 |
| 2007/0117623 A1 | 5/2007 | Nelson et al. | |
| 2007/0259716 A1 | 11/2007 | Mattice et al. | |
| 2007/0259717 A1 | 11/2007 | Mattice et al. | |
| 2007/0295807 A1* | 12/2007 | Antos et al. | 235/382 |
| 2008/0132313 A1 | 6/2008 | Rasmussen et al. | |
| 2009/0005165 A1* | 1/2009 | Arezina et al. | 463/37 |
| 2009/0055205 A1 | 2/2009 | Nguyen et al. | |
| 2009/0117989 A1 | 5/2009 | Arezina et al. | |
| 2009/0259588 A1* | 10/2009 | Lindsay | 705/40 |
| 2010/0130280 A1 | 5/2010 | Arezina et al. | |

* cited by examiner

*Primary Examiner* — Dante Ravetti
(74) *Attorney, Agent, or Firm* — Brooke W. Quist; Marvin A. Hein; Philip J. Anderson

(57) ABSTRACT

Various systems, gaming devices, and methods for biometrically identifying a player are disclosed herein. The capture of the biometric information is undisclosed to the player. The captured biometric information may be used to verifying a player's age, prevent underage gambling, promote responsible gaming, authorize and/or authenticate an electronic funds transfer. The biometric information may also be used to provide player-centric gaming. The player's preferences are associated with the biometric information, and a gaming device is reconfigured to the player's preferences once the player's biometric information is obtained at the gaming device.

21 Claims, 17 Drawing Sheets

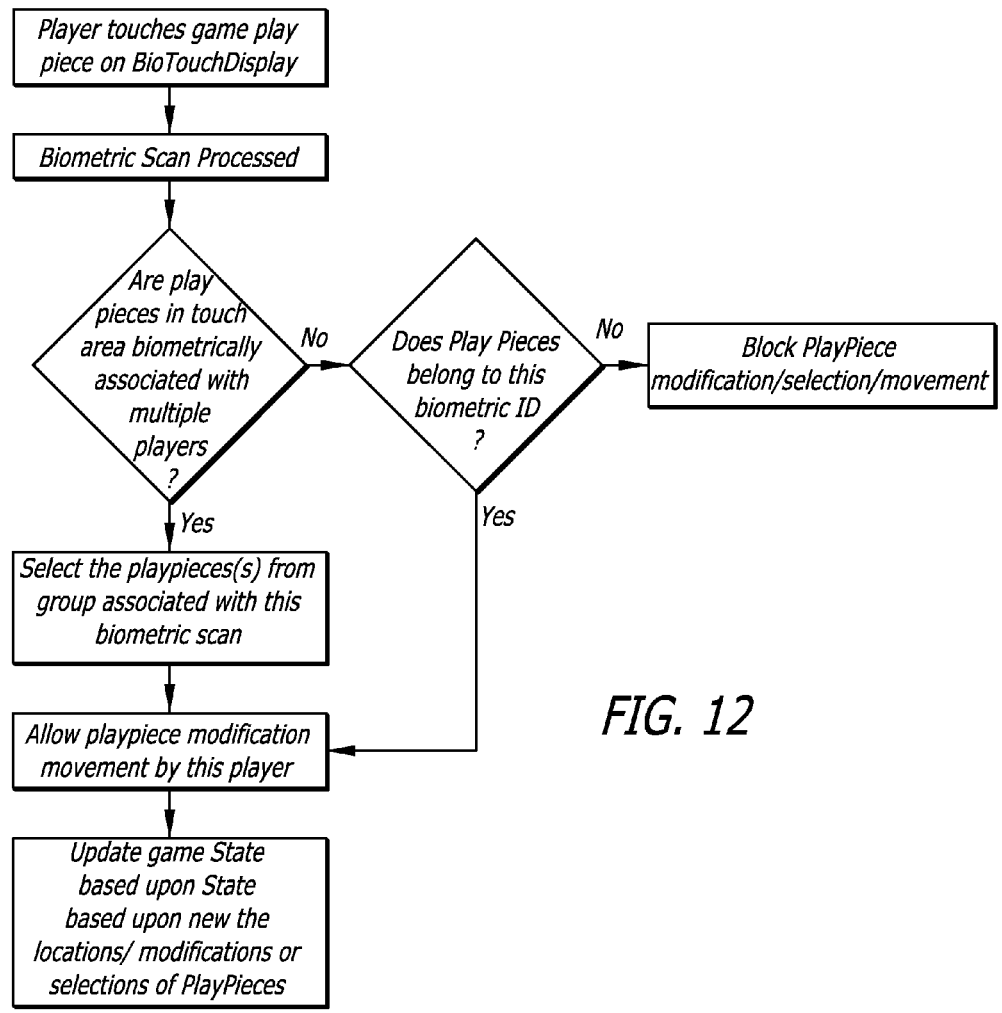

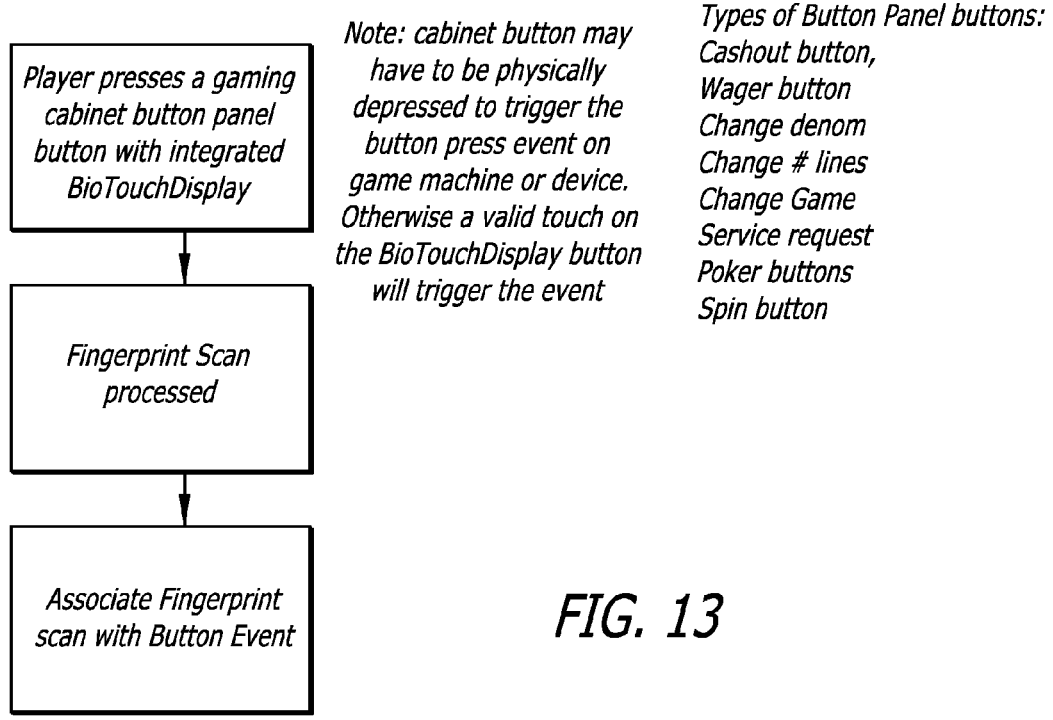

METHODS FOR BIOMETRICALLY IDENTIFYING A PLAYER

CROSS-REFERENCE TO RELATED APPLICATIONS

This application claims the benefit of U.S. Provisional Application No. 61/019,473, filed Jan. 7, 2008, which is hereby incorporated by reference. This application is also related to co-pending U.S. patent application Ser. No 12/350,184 concurrently filed on Jan. 7, 2009, entitled GAMING DEVICES FOR BIOMETRICALLY IDENTIFYING A PLAYER, which is hereby incorporated by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF EMBODIMENTS

The present disclosure relates generally to gaming devices, gaming systems, and related methods for player identification.

BACKGROUND

Gaming devices and systems have incorporated biometric technology. For example, biometric technology has been incorporated into gaming devices to aid in the electronic transfer of funds. Additionally, gaming systems use biometric technology such as, an anonymous facial recognition system, in connection with player bonusing. However, current casino gaming systems do not provide a non-invasive biometric identification system to ensure age compliance in regulated gaming markets.

SUMMARY

Briefly and in general terms, various embodiments are directed towards devices, systems, and methods involving unobtrusive capturing of biometric information. According to one method, biometric data is used in connection with enforcing responsible gaming limits. The method includes receiving player input for gaming limits on a first biometric input device, wherein the first biometric input device captures biometric data and player input; capturing a first biometric sample from the first biometric input device, wherein capturing of the first biometric sample is undisclosed to the player; configuring a gaming device according to the gaming limits set by the player; initiating game play in response to player input; obtaining a second biometric sample from the player, wherein capturing of the second biometric sample is undisclosed to the player; comparing the first and second biometric samples; and preventing further game play when game limits are reached and the first and second biometric samples are matching.

In another method, biometric data is used to reconfigure a gaming device. The method includes capturing a first biometric sample of a player at a first gaming device, wherein capturing of the first biometric sample is undisclosed to the player; associating the first biometric sample with game session data from a first gaming session; storing the first biometric sample and the game session data; capturing a second biometric sample during a second gaming session at a second gaming device, wherein capturing of the second biometric sample is undisclosed to the player; and reconfiguring the second gaming device based on the game session data from the first gaming session when the second biometric sample are matching.

In yet another method, biometric data is used for age verification of a player. The method includes verifying an age of a first player prior to commencing a gaming session on a gaming device; obtaining a first biometric sample from the first player; initiating a gaming session on the gaming device; capturing a second biometric sample from a player during the gaming session wherein capturing of the second biometric sample is undisclosed to the player; and preventing further game play during the gaming session when the second biometric sample does not match the first biometric sample.

Another method is directed to using biometric data obtained at the gaming device to authorize electronic fund transfers. The method includes receiving a request for an electronic funds transfer at a gaming device from a player; capturing a biometric sample from the player; verifying an identity of the player based on the captured biometric sample; and authorizing the transfer of funds to the gaming device once the identity of the player is verified.

Yet another method is directed to biometric identification. The method includes storing biometric data based upon a first biometric scan from a player at a gaming device, wherein capturing of the first biometric sample is undisclosed to the player; printing a voucher including data from the first biometric scan; obtaining a second biometric scan from the player, wherein capturing of the second biometric sample is undisclosed to the player; and determining whether the first and the second biometric scans are matching prior to redeeming the voucher.

Another method is directed to presenting a multi-player game on a single display and using a biometric input device to distinguish game pieces for multiple players. The method includes presenting a first set of video images of play pieces on a single display of a gaming device in response to receiving funds from a first player; obtaining a first biometric sample from the first player when the first player touches a location on the biometric input device that corresponds to the location of the video images of the play pieces, wherein obtaining the first biometric sample is undisclosed to the player; associating the first biometric sample from the first player with the first set of video images of the play pieces; receiving input from the first player moving one or more of the play pieces on the single display; obtaining a second biometric sample when receiving first player input moving one or more of the play pieces to a new location on the single display, wherein obtaining the second biometric sample is undisclosed to the player; and allowing movement of one or more of the play pieces to the new location when the first and second biometric samples are matching.

In addition to various methods of utilizing biometric data, various gaming devices and gaming systems having a biometric input device are disclosed herein. According to one embodiment, the gaming device includes a main display for presenting a game, a secondary display, and a biometric input device overlaying the secondary display. The biometric input device obtains a fingerprint scan from a player when the biometric input device is touched by the player during a gaming session. The fingerprint scan is undisclosed to the player and unobtrusively obtained from the player. The gaming device also includes a processor in communication with the biometric input device. The processor determines whether the same player is present at the gaming device based upon fingerprint scans taken during the gaming session.

In another embodiment, the gaming device includes a display for presenting a game, a plurality of buttons for receiving player input, and a biometric input device positioned on at least one of the plurality of buttons. The biometric input device obtains a fingerprint scan from a player when the biometric input device is touched by the player during a gaming session. The fingerprint scan is undisclosed to the player and unobtrusively obtained from the player.

In yet another embodiment, the gaming device includes a video display for presenting a multi-player game and video images of game pieces for each player. The gaming device also includes a biometric input device overlaying the display. The biometric input device obtains a biometric sample from a first player of the multi-player game. The biometric input device unobtrusively obtains the biometric sample from the player. Additionally, the biometric sample is undisclosed to the player. The gaming device also includes a processor in communication with the display and the biometric input device. The processor associates the video images of the game pieces with the first player based on the biometric sample obtained from the first player. The processor also tracks the location of the game pieces based on the movement and location of biometric sample obtained by the first player.

In addition to gaming devices, various gaming systems are disclosed herein. In one embodiment, the gaming system includes a plurality of gaming devices, a gaming server, and a biometric server. Each gaming device has a biometric input device that unobtrusively obtains a biometric scan from a player. The gaming server managers and routes messages from the gaming devices and one or more servers. The biometric server manages, stores, and routes biometric data obtained at the plurality of gaming devices.

Furthermore, features of the disclosed embodiments will become apparent from the following detailed description, taken in conjunction with the accompanying drawings.

BRIEF DESCRIPTION OF THE DRAWINGS

FIG. 11 is a flowchart of a player-initiated gaming device associated with a biometric input device.

FIG. 12 is a flowchart of a biometric input that is associated with game pieces or graphical elements on a display screen.

FIG. 13 is a flowchart of a biometric input device integrated into a gaming device.

DETAILED DESCRIPTION

Systems and methods of non-invasive biometric identification are disclosed herein. Various embodiments are directed to a biometric recognition system for identifying a player at a gaming device with or without a player card or other personal identification (e.g., personal identification number or challenge-response authentication). Generally, authorized players of game devices may be identified using an integrated biometric input device. In one embodiment, the biometric input device is an integrated biometric touch screen and display. In other embodiments, the biometric input device is included with one or more buttons on the player interface of a gaming device. The biometric input device may obtain biometric information such as, but not limited to, fingerprint scan, retinal scan, or iris scan.

The information associated with the biometric input device may be used in connection with issuing awards, bonuses, or services to identified player. Additionally, the biometric information may be used to restrict the activities of identified problem gambler or banned players. The biometric information may be used to restrict illegal activities such as, but not limited to, money laundering, counterfeiting, or underage gambling. The biometric information may also be used to authenticate or provide additional security measures for electronic funds transfer authorization, transaction auditing, or account based gaming.

In another embodiment, the biometric information may be used to provide player-centric gaming. For example, once a player is identified through the obtained biometric information, a game may be reconfigured according to a player's previously established preferences. In another embodiment, a player's game state or game data may be associated with the biometric information. The game state or game data may be saved and later retrieved by the player based on the same biometric information received on a gaming device having a biometric input device.

In yet another embodiment, a biometric input device is associated with a gaming device that presents a multi-player game. The biometric device input device associates game pieces with each unique biometric data (e.g., fingerprint).

The buttons may be used to carry out functions such as cashout, wager, change wager denominations, change number of lines, change game, service request, spin, hold or discard a card, or any function that is contemplated or known in the art.

Figure 1:
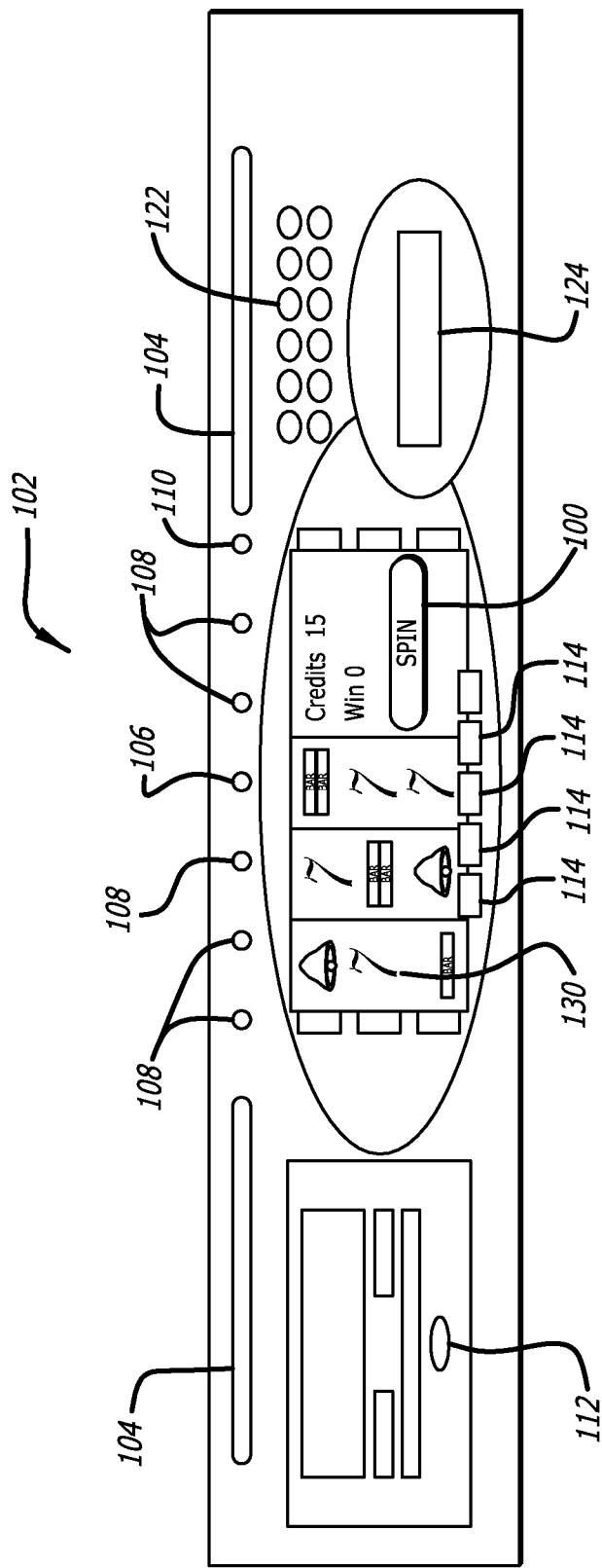
FIG. 1 is a front view of one embodiment of a system component panel on a gaming device used for player identification.

The embodiments are illustrated and described herein, by way of example only, and not by way of limitation. Referring now to the drawings, and more particularly to FIGS. 1-17, there are shown illustrative examples of a biometric input device that is integrated with a gaming device. FIG. 1 illustrates a front view of one embodiment of a biometric input device 100 incorporated into a system component panel 102 on a gaming device that is used for player identification. As shown in FIG. 1, the biometric input device 100 is a biometric touch screen in which a player fingerprint may be captured when a player touches the surface of the screen. In this embodiment, the biometric input device 100 is integrated with an iView® display 130 manufactured by Bally Gaming, Inc.

As shown in FIG. 1, the system component panel 102 also includes a proximity detection antenna 104 (and circuitry), a pinhole camera 106 for biometric facial recognition and/or image capture/surveillance purposes, light emitting diodes (LEDs) 108 projecting visible or infrared light for facial illumination. The system component panel 102 may also include a microphone 110 for player communication to a casino help desk or other services. As shown in FIG. 1, the system component panel 12 also includes a PIN Pad 122 for password/PIN entry/feature request. The system component panel 12 may also have a player card reader 124. The player card reader 24 may be a magnetic stripe or smart card reader. Additionally, the system component panel 102 may also include a dual port, IP, serial, or USB printer 112. Optionally, the system component 102 may include a fingerprint reader (not shown) that is separate and distinct from the biometric input device 100. As shown in FIG. 1, soft-key buttons 114 that are positioned around the display 10. The functions of the soft-key buttons 114 are presented on the display 130, and the functions of the buttons may be changed. As those skilled in the art will appreciate, the system component panel 102 may include less than all the components (or different combination of components) from that which is depicted in FIG. 1. Some or all of these peripheral components may be connected to the base EGM processor board rather than the iVIEW processing board or the Game Monitoring Unit (GMU).

Figures 1, 2:
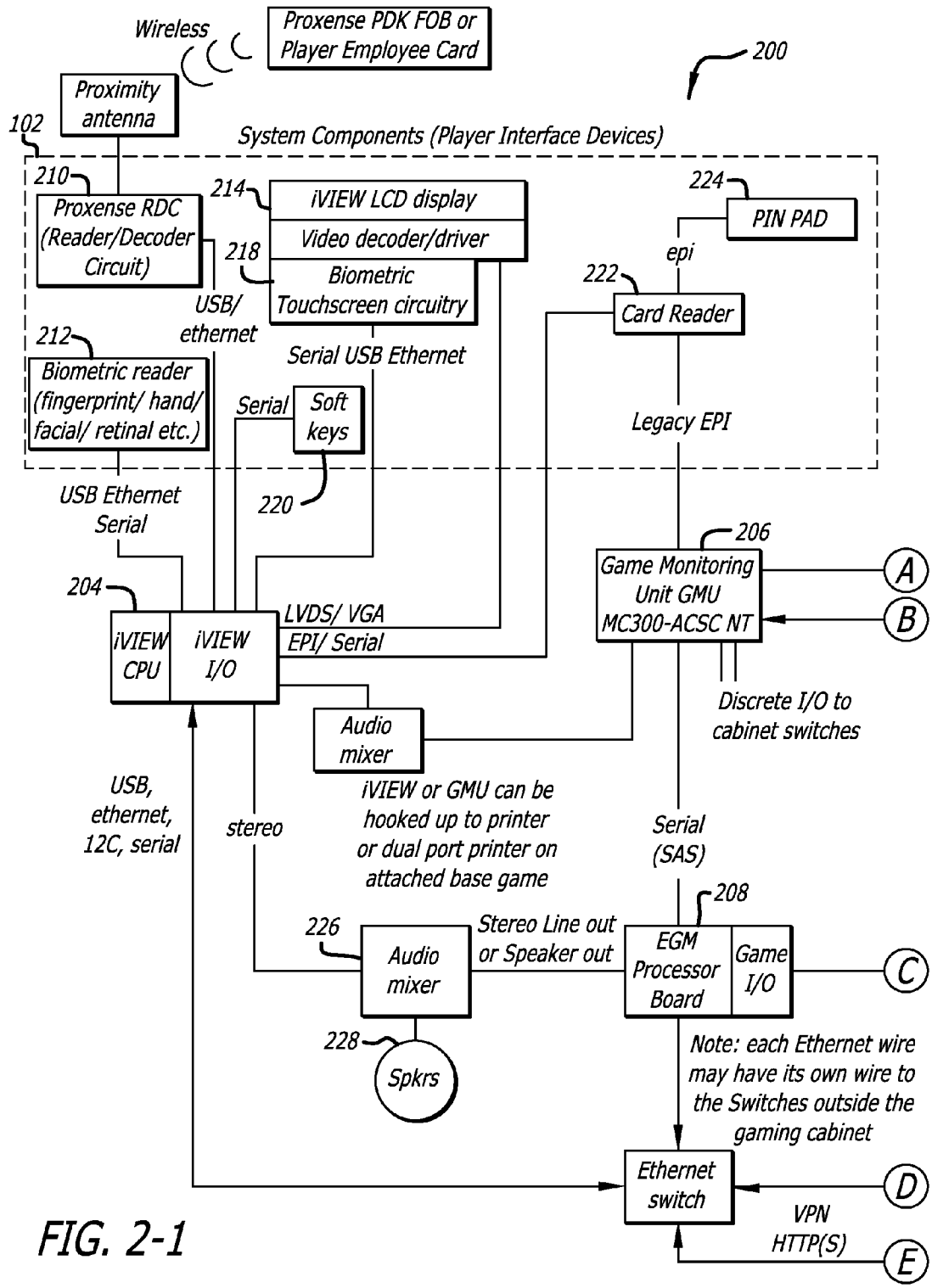
FIG. 2 is a block diagram of one embodiment of an electronic gaming machine (EGM) and its system components.
Figure 2:
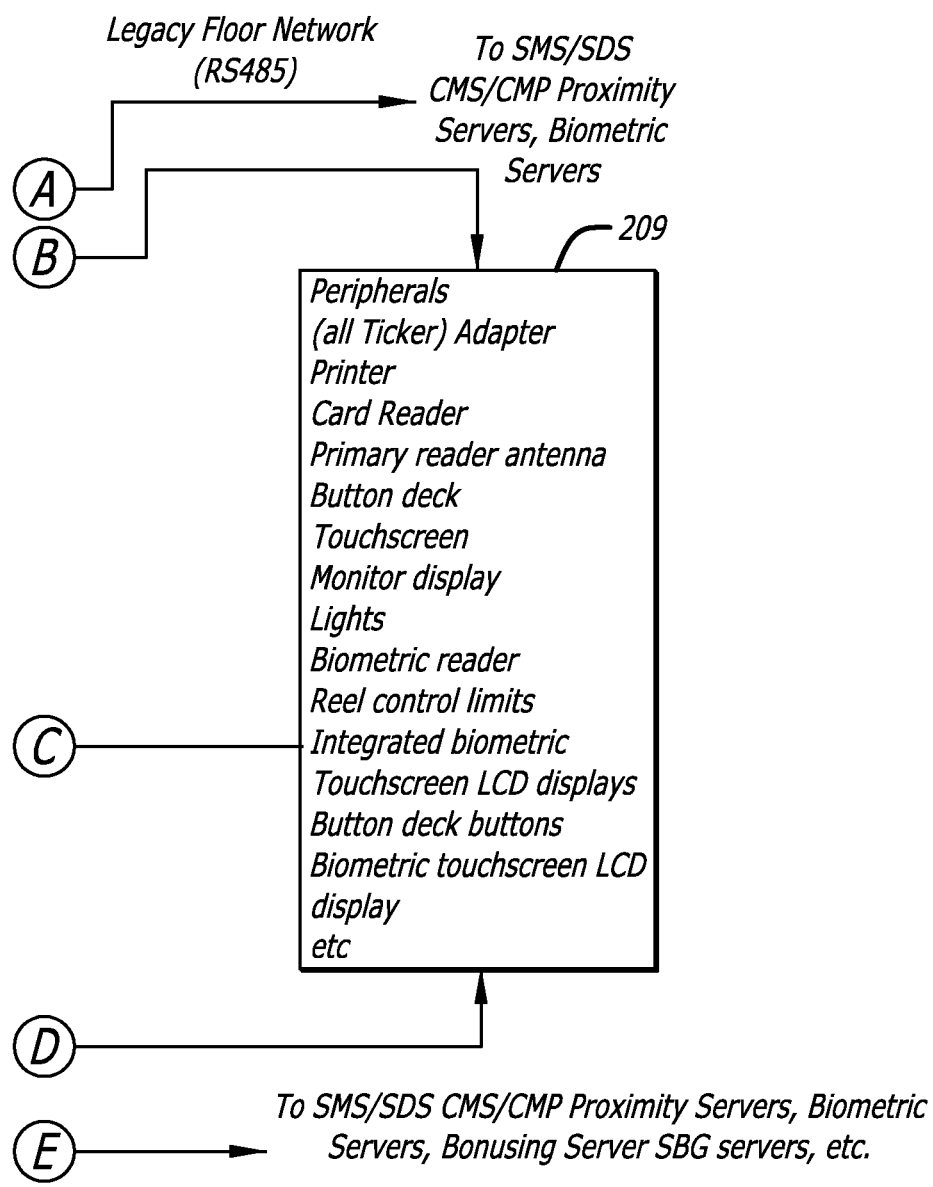

In one embodiment, the various components of the system component panel 102 are mounted on a metal bracket (not shown) that may be fixed to a gaming machine. As shown in FIG. 2, these components are linked into a virtual private network of the system components in the gaming device. The system components include an iVIEW processing board 140 and a GMU processing board 142. The iVIEW processing board 140 and the GMU 142 are connected to various systems and servers such as, but not limited to, a slot accounting system (SMS/SDS), player tracking system (CMP/CMS), biometric authentication servers, print servers, bonusing servers, download/configuration servers, bonus game servers (e.g., Bally Live Rewards server or Bally Power Winners servers), iVIEW media servers, advertisement servers, offer servers, and other servers throughout the casino.

FIG. 2 illustrates one embodiment of an electronic gaming machine 200 (EGM) and the various components included with the EGM. As shown in FIG. 2, the EGM 200 includes system components 102, an iVIEW processing board 204, game monitoring unit (GMU) processing board 206, EGM processor board 208, and one or more peripherals 209 in communication with the EGM processor board. The system components 102 include a proximity sensor 210 (having a reader/decoder circuitry), biometric reader 212, a video display 214 (and associated decoder and drivers 216), biometric input device 218, one or more soft keys 220, card reader 222, and PIN pad 224. As shown in FIG. 2, the proximity sensor 210 (having a reader/decoder circuitry), biometric reader 212, video display 214 (and associated decoder and drivers 216), biometric input device 218, and one or more soft keys 220 communicate with the iVIEW processing board 204 via USB, serial, parallel, RS485, or Ethernet connections. The card reader 222 and PIN pad 224 communicate with the GMU via EPI protocol. Alternatively, the system components are directly IP addressable on the gaming network.

The EGM processing board 208 is communication with an audio amplifier/mixer 226 (which in turn is in communication with speakers 228), and one or more servers in the gaming network via an Ethernet switch 230. Additionally, as shown in FIG. 2, the EGM 208 is in communication with the iVIEW processing board 204 and the GMU 206. The EGM 208 is also in communication with peripheral such as, but not limited to, bill/ticket acceptor printer, card reader, proximity reader/antenna, button deck, touchscreen, monitors, displays, lights, biometric reader, reel control units, integrated biometric touchscreen LCD displays, PIN pad, card reader, soft keys, iVIEW BioTouchDisplay, touch screen circuitry, a separate biometric finger print reader, facial recognition camera, video or still camera, dual-port printer, or the like.

As shown in FIG. 2, the iVIEW processing board 204 and the GMU 206 are separate components, but the GMU and iVIEW processing board can combined into one device. The combined device may have video mixing technology to mix the VGA video from the EGM processor signals with the VGA source from the iVIEW display to present a game, game information, bonusing, or other information on any monitor on the gaming device in a Picture in Picture (PIP) or full screen format.

The various components of the system component panel have USB, serial, parallel, RS485, Ethernet connections to the system components in the gaming cabinet or these components are directly IP addressable on the gaming network. The GMU has a connection to the base game through a serial SAS connection or optional G2S classes over Ethernet. The system components in the gaming cabinet are connected to the servers using HTTPS over Ethernet. Firmware, media, operating systems, configurations can be downloaded to the system components from the servers. Generally, this data is authenticated prior to installation on the system components.

Figure 3:
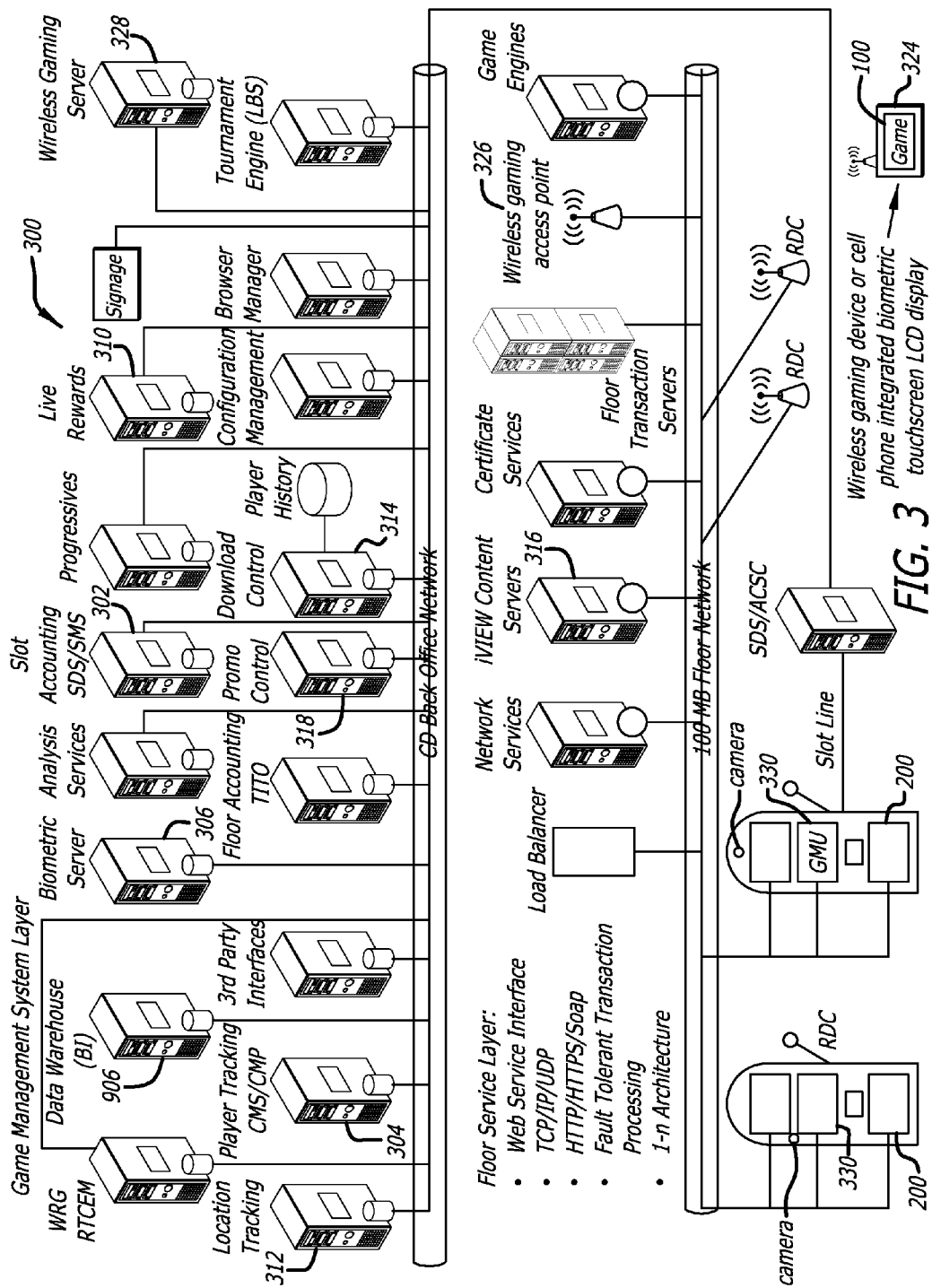
FIG. 3 is a network drawing of the various components in one embodiment of a casino gaming system.

FIG. 3 illustrates one embodiment of a gaming system 300 having one or more EGMs 200 incorporating a biometric input device. The gaming machines 200 may be located in a single casino or in multiple gaming locations. As shown in FIG. 3, the EGMs 200 are connected to the slot system (SMS/SDS) 302, player tracking system (CMP/CMS) 304, biometric authentication servers 306, print servers (not shown), bonusing servers (e.g., Bally Live Rewards server) 310, proximity location based tracking servers 312, download/configuration servers 314, iVIEW media servers 316, advertisement servers 318, offer servers, responsible gaming servers and other servers throughout one or more casinos.

In one embodiment, the system components in the EGMs 200 are connected to the servers using HTTPS over Ethernet. In other embodiments, the system components are connected to the servers by any connections known or developed in the art. Firmware, media, operating systems, and configurations can be downloaded to the system components from one or more servers in the gaming system 300. Downloaded data is authenticated prior to installation on the system components.

As shown in FIG. 3, the gaming system 300 includes wireless gaming devices 324 having biometric input devices 100, network access points 326, and wireless gaming servers 328. In one embodiment, EGMs 200 and player tracking devices 330 have integrated biometric input devices that act as both a user interface and biometric scanner.

Figure 4:
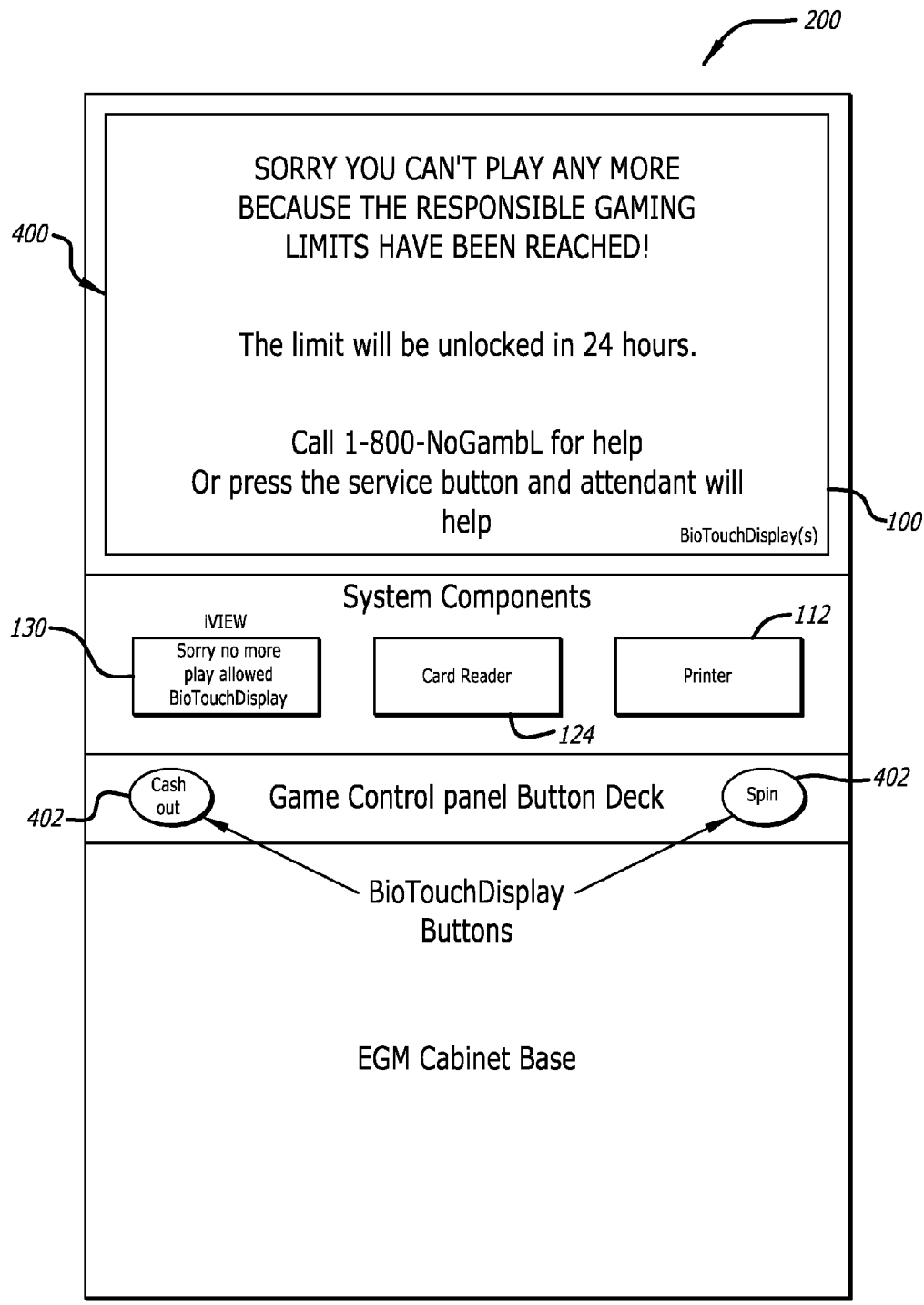
FIG. 4 is a depiction of one embodiment of an EGM displaying a responsible gaming message.

FIG. 4 illustrates one embodiment of an EGM 200 having a responsible gaming system. Game play has been disabled in response to a responsible gaming limit being achieved. In this embodiment, a biometric input device 100 is able to associate a player's established gaming limit with biometric data obtained on the EGM 200. The message presented on the display 400 notifies the anonymous player has reached the responsible gaming limits. Additionally, the message also presents an expiration limit in which gaming may be resumed. As shown in FIG. 4, the responsible gaming message is presented on both the iVIEW screen 130 and a game monitor screen 400.

In one embodiment, the biometric input device 100 is a touch screen positioned over one or more of the display devices 130, 400 on the EGM 200. The display device may be provided in the top box, main gaming cabinet, and/or on the player tracking panel. As shown in FIG. 4, the EGM 200 includes an intelligent downloadable deck button 402 with integrated biometric touch screen and LCD display. One or more fingerprints, handprint, or palm print is scanned by the biometric input device. In another embodiment, one or more physical buttons on the button deck incorporate a biometric touch screen device. In yet another embodiment, the biometric input device is a camera having facial recognition software.

In one embodiment, responsible gaming limits are associated with and checked against biometric data captured on the EGM 200. If responsible gaming limits are reached on the EGM or another EGM within the casino gaming system, game play is blocked. Optionally, a notification message is presented to the user as shown in FIG. 4. The responsible gaming limits may be configured by the player or jurisdictional requirements. The responsible gaming limits may be based on any amount of wagering, losses, wins, session time, loss rate, win rate, wager rate, or time of play on the EGM. The responsible gaming limits may be established at a registration kiosk, player club desk, lottery office, web portal, or on the EGM.

The responsible gaming limits are applicable to an unidentified player since the gaming limits are associated with biometric information. Accordingly, game play throughout one or more casinos may be accrued towards the responsible gaming limits. The responsible gaming limits are also applicable to casino patrons who are enrolled a player tracking club but do not use their player card during a gaming session. Again, since the responsible gaming limits are associated with biometric data, any gaming is accrued toward the gaming limits any time the player touches the biometric input device on the EGM 200.

Figure 5:
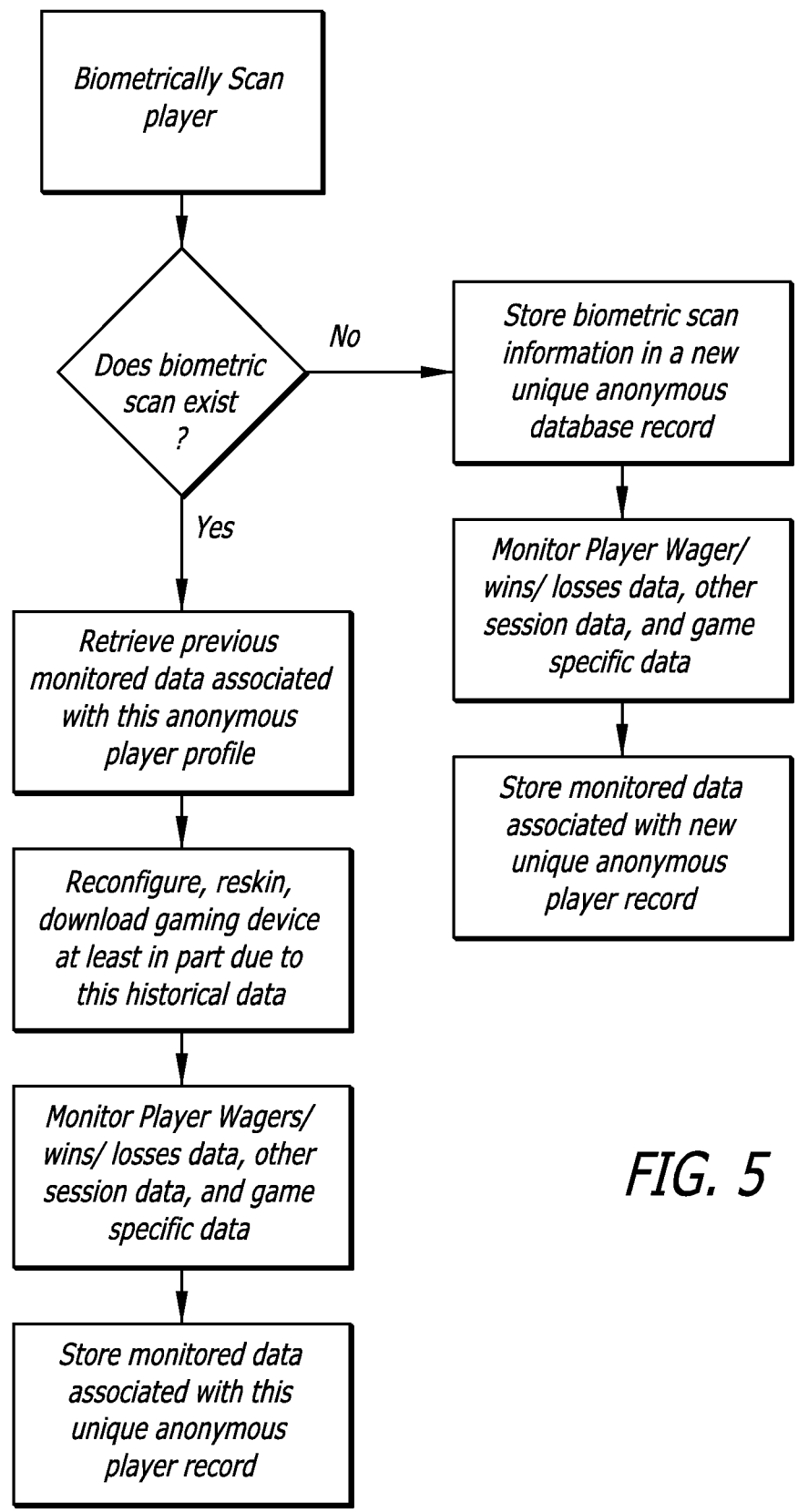
FIG. 5 is a flowchart of a player-centric reconfiguration of a gaming device based upon a biometric fingerprint scan of a player.

FIG. 5 illustrates on method of reconfiguring a game for an anonymous (or otherwise unidentified) player. The player is anonymous in the sense that the player is not identified in terms of name or is otherwise registered with the gaming establishment. A configuration of an EGM may be associated with the biometric information obtained from the anonymous player. In one embodiment, biometric information is being obtained without the knowledge of the anonymous player. In another embodiment, the anonymous player is notified that biometric information is being obtained from the player. Once the anonymous player returns to an EGM 200, the EGM may be reconfigured or re-skinned (i.e., change in appearance of game) based upon the player's past game play wagers, win history, loss history, session history, previous type of game device, or other play information.

In one embodiment, a biometric scan is accomplished by the player touching the touch screen having biometric scanner device attached to or associated with the gaming device. This anonymous biometric fingerprint scan taken by the biometric display may be used to provide a player-centric gaming configuration even though the player has not previously registered at a casino club desk or has not inserted a player tracking card into the gaming device.

In another embodiment, the progress of a game (i.e., game state) may be restored and game play can continue on the same or different gaming device when a successful match of biometric information is achieved between the initial biometric scan taken from another session and the subsequent biometric scan. In yet another embodiment, bonusing for the player may be also reconfigured based upon this biometric scan taken. If a fingerprint match is not found, then a new, unique, and anonymous biometric profile is created. This profile may be saved on a gaming device or on a biometric server. In a subsequent play session, the game state can be restored by reconfiguring the gaming device of downloading the game state from a gaming server associated with the player's biometric profile.

In another embodiment, the biometric data obtained by the biometric input device may be used to make a player-centric gaming device tailored to this specific patron identified by the biometric sample taken. In one method, fingerprint/hand print samples are pre-associated with a patron identification. When a patron touches the biometric input device, the player can be identified by the biometric sample alone. The gaming device may be automatically reconfigured to player preferences. In another embodiment, one or more displays may present the player's preferences that have been learned by the CMP/CMS or business intelligence system. The player may then elect a particular gaming device configuration, and the gaming machine will be reconfigured accordingly. In yet another embodiment, the player may manually configure their preferences which will be then associated with the biometric information. In another embodiment, reconfiguration offers may be presented to the player. Upon acceptance, the gaming device would be reconfigured and/or new content would be downloaded to the gaming device.

The following are some non-limiting examples of configurations and/or downloads that may be reconfigured upon biometric identification of a player. For example, the gaming device may be reconfigured to present the player's favorite games, luckiest games, the game with the longest play time, tournament games, or any combination thereof. The gaming device may be configured according to the player's favorite game themes, preferred denominations, favorite group of games, favorite game combinations, favorite progressive games, favorite group play games, or any combination thereof.

Figure 6:
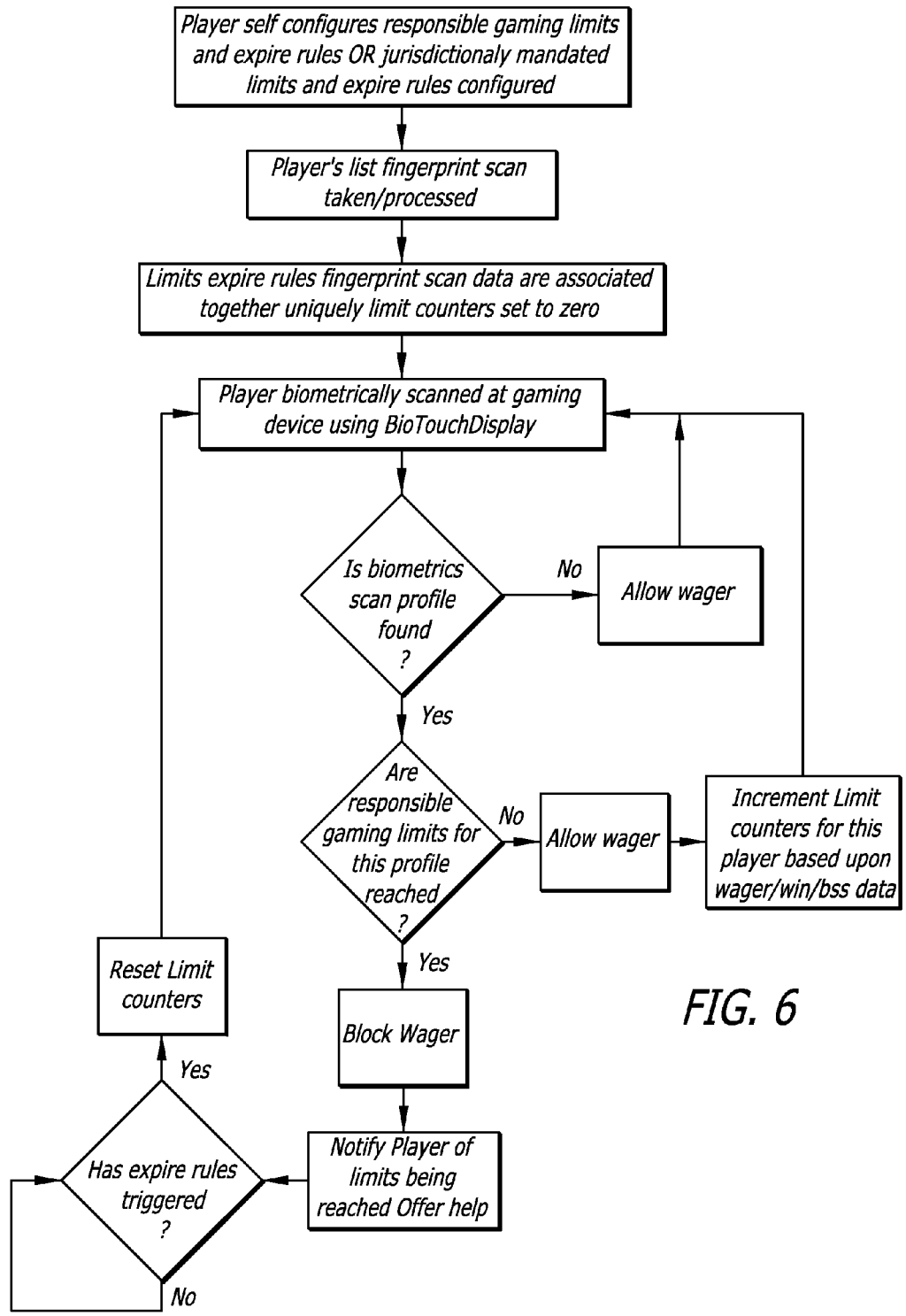
FIG. 6 is a flowchart of a responsible gaming system being using biometric information obtained from a biometric input device.

FIG. 6 illustrates one method of establishing a responsible gaming limit. As shown in FIG. 6, the player may configure the gaming limits at a threshold at or below the jurisdictional rules for responsible gaming. According to one method, the player may configure the gaming limits according to wager per unit time. In other methods, the limits may be based on number of wins, losses, rate of wins, rate of losses, amount of money won, amount of money lost, or any other criteria. Additionally, the player may also establish the duration in which the player is prevented from gambling when a responsible gaming limit is achieved. For example, the player may select one hour, 12 hours, or two days before the responsible gaming limit is removed.

Once the gaming limit is established, the player's fingerprint or other biometric scan is taken and processed. The gaming limit and the biometric information are then associated together. The gaming limit counter is also set to zero. During a gaming session, the player is biometrically scanned at the gaming device and a gaming limit counter is incremented. In one embodiment, the player is unaware of when or even if the player is being biometrically scanned. Alternatively, the player is notified that a biometric scan is or was taken. A determination is made to whether a player profile is associated with the captured biometric scan. If there is no profile, a wager is allowed and gaming continues. If there is a profile having a responsible gaming limit, a determination is made to whether the limits have been reached. If not, the wager is allowed and the game limit counter is incremented.

Once the responsible gaming limits are reached, any additional wagering is blocked at the gaming device. Wagering may be prevented by disabling bill acceptors or currency acceptors. Generally, the player is notified of the limit being reached. Optionally, the player may be offered help with a possible gambling problem. Game play is blocked until expiration rules have cleared, and the increment limit counters associated with this biometric scan are reset. In one embodiment, any remaining credits on the gaming machine are cashed out.

Figures 7A, 7B:
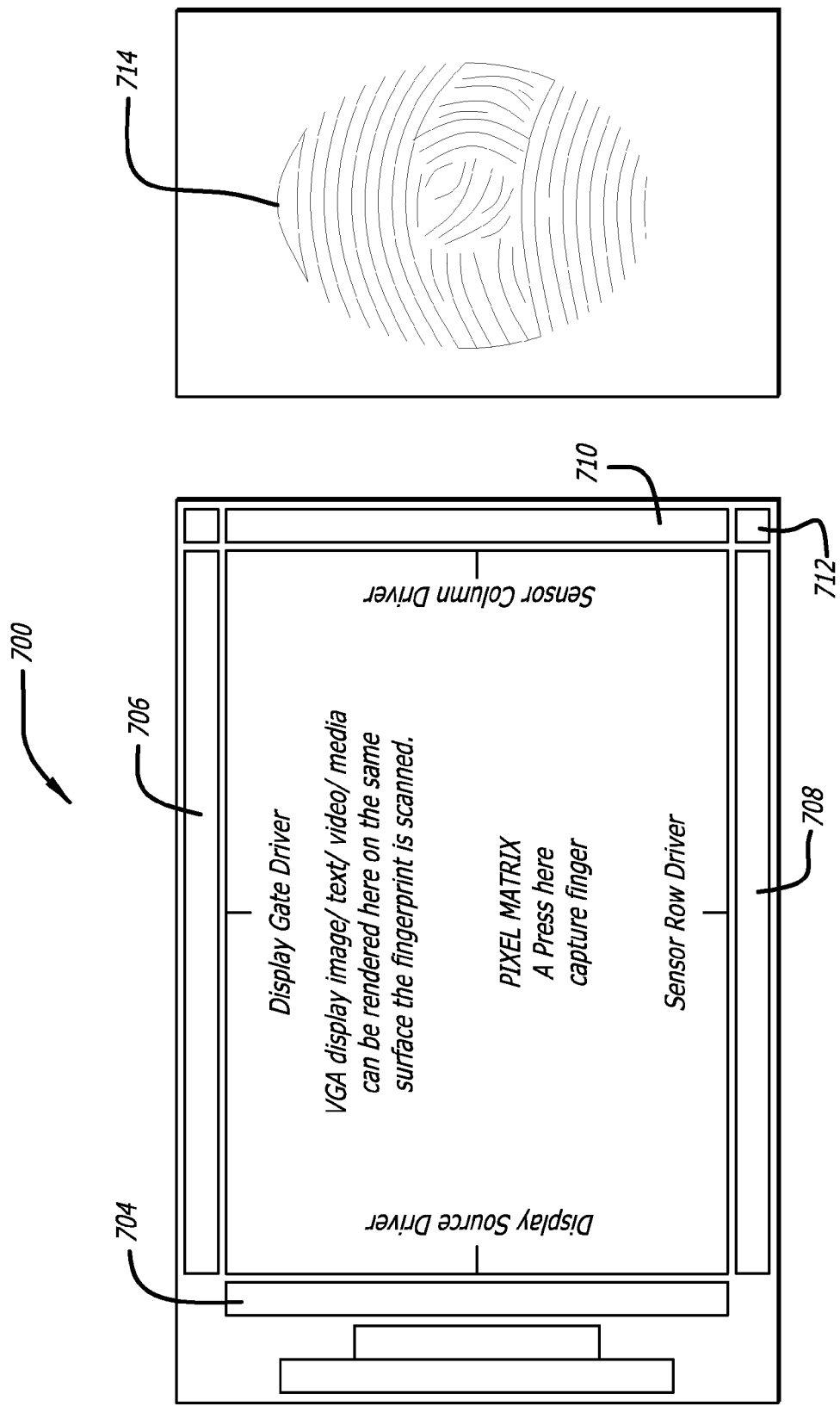
FIG. 7A is a depiction of one embodiment of a biometric input device.
FIG. 7B is a depiction of a fingerprint captured using the biometric input device of FIG. 7A.

FIG. 7A illustrates one embodiment of a semiconductor device 700 with integrated LCD display and biometric touch screen input device 702. The pixel matrix of the LCD display 702 is driven by a display source driver circuitry 704 and a display gate driver circuitry 706. The biometric touch screen device 702 is driven by an electronic circuit consisting of a sensor row driver 708, sensor column driver 710, and amplifier circuitry 712. As a person depresses his finger on the LCD display device 702, a finger print 714 is captured, as shown in FIG. 7B. In one embodiment, the semiconductor device 700 is a Sharp Semiconductor VGA 640×460 300 pixels per inch resolution LCD display capable of 30 fps. The display 700 allows for simultaneous or substantially simultaneous scanning of your fingerprint and provides touch screen event coordinates to the underlying application running on the processor driving the display. The underlying applications may be games of skill or change, promotional bonus games, electronic funds transfer, casino player account management, advertising, player offers, bonusing, and the like.

Figure 8:
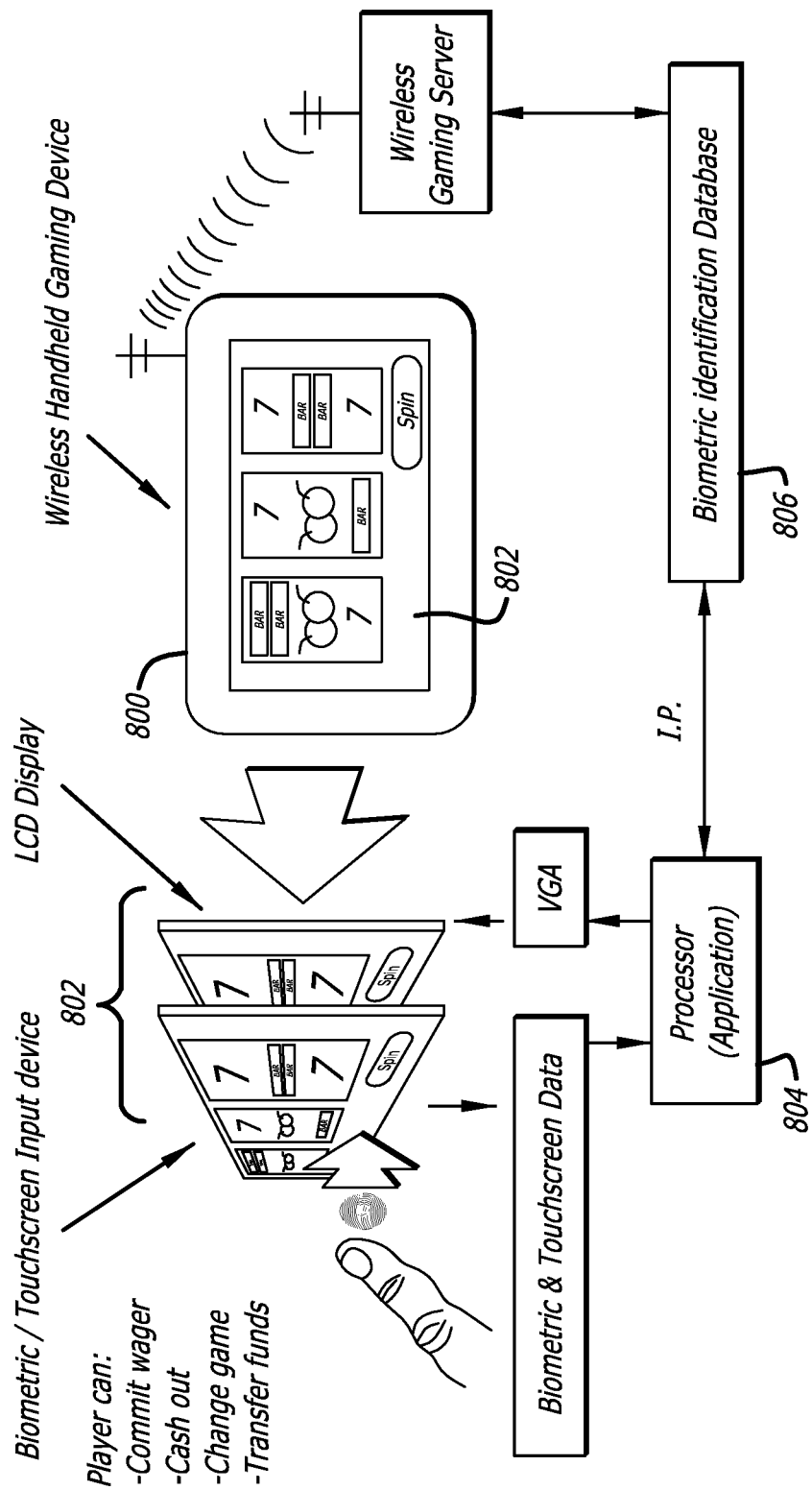
FIG. 8 is a drawing of one embodiment of gaming system including a wireless gaming device having a biometric touch screen and an associated biometric identification server/database.

FIG. 8 illustrates one embodiment of an integrated biometric touch screen LCD device 802 integrated with a wireless gaming terminal 800. As shown in FIG. 8, the processor 804 sends VGA or video stream signals to the LCD display 802 in the BioTouchDisplay. The biometric fingerprint scan and touch screen input data are sent to the processor 804 for analysis and/or forwarding to a biometric identification database 806. A comparison of the biometric scan to other fingerprint scans in the biometric database is carried out. In this way, a player can be identified without using a separately attached biometric peripheral in proximity to or associated with the wireless gaming handheld device. The integration of the LCD and the biometric touch screen reader provides for a cleaner user interface and form factor for the wireless gaming device.

Any positive action by the player (e.g., a button press on the display) triggers the capture of a fingerprint sample on the biometric input device. For example, a single spin button on the video screen when pressed can also capture the player's biometric sample. Game play can be blocked if the fingerprint sample is non-authorized. Optionally, security staff is notified if an unauthorized player is playing the gaming device or initiates any other transaction on the gaming display 802.

Automated account-based gaming may be carried out with a biometric touch screen gaming device. Upon each wager commit by a player (non-limiting examples include pressing a spin/play/begin game button), a player account is debited the amount of credits required to play this game. The fingerprint scan taken is the biometric authorization for account-based game play. A complete record of scans taken by the device is stored for retrieval and audit purposes. The complete record also provides for player dispute resolution. Funds transfer to and from the wireless gaming device can occur when the player is validated by the biometric identification and comparison database of authorized fingerprints.

Figure 9:
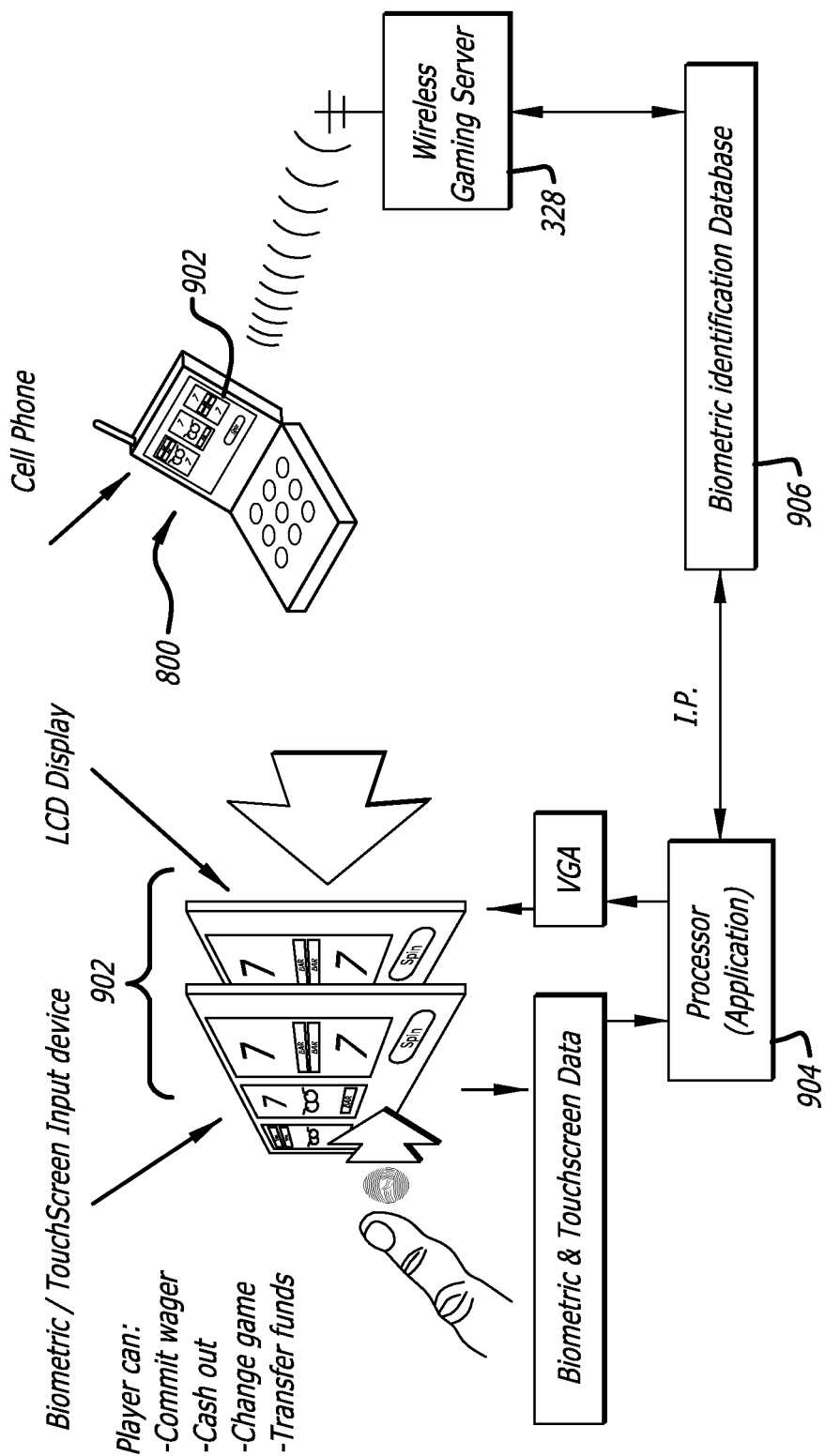
FIG. 9 is a drawing of another embodiment of a gaming system including a wireless gaming device having a biometric touch screen and an associated biometric identification server/database.

FIG. 9 illustrates one embodiment of a cellular phone 900 having an integrated biometric touch screen LCD device 902. A processor 904 sends VGA or video stream signals to the LCD display 902. Moreover, the biometric fingerprint scan and touch screen input data are sent to the processor 904 for analysis/forwarding to the biometric identification database. Comparison of this scan to other fingerprint scans in the biometric database 906 can then be done. Again, a player can be identified without using a separately attached biometric peripheral in proximity to or associated with the cell phone. The integration of the LCD and the biometric touch screen reader provides a cleaner user interface and form factor for the cell phone. Thus, any positive action by the player (like a button press) on the touch screen 902 triggers the capture of a fingerprint sample on the device. In one embodiment, touching a single spin button on the video screen may be used to capture the player's biometric sample. Additionally, play can be blocked if the biometric sample is unauthorized. Optionally, security staff can be notified if an unauthorized player is playing the gaming device or initiates any other transaction on the gaming display.

Like the embodiment shown and described in FIG. 8, automated, account-based gaming can be accomplished with the cellular phone having 900 having an integrated biometric touch screen LCD device 902. Accordingly, upon each wager commit (e.g., pressing the BioTouchDisplay spin/play/begin game button), a player account can be debited the amount of credits required to play a game. Furthermore, the fingerprint scan taken upon the wager commit is also the biometric authorization for the account based game play. In one embodiment, a complete record of scans taken by the device is stored for retrieval, audit purposes, and player dispute resolution. Additionally, funds transferred to and from the cellular phone 900 can occur when the player is validated. In other words, the biometric scan captured by the biometric touch screen 902 may be compared with authorized fingerprints in a database of authorized fingerprints, thereby providing a level of security that the transaction is authorized by the proper player.

Figure 10:
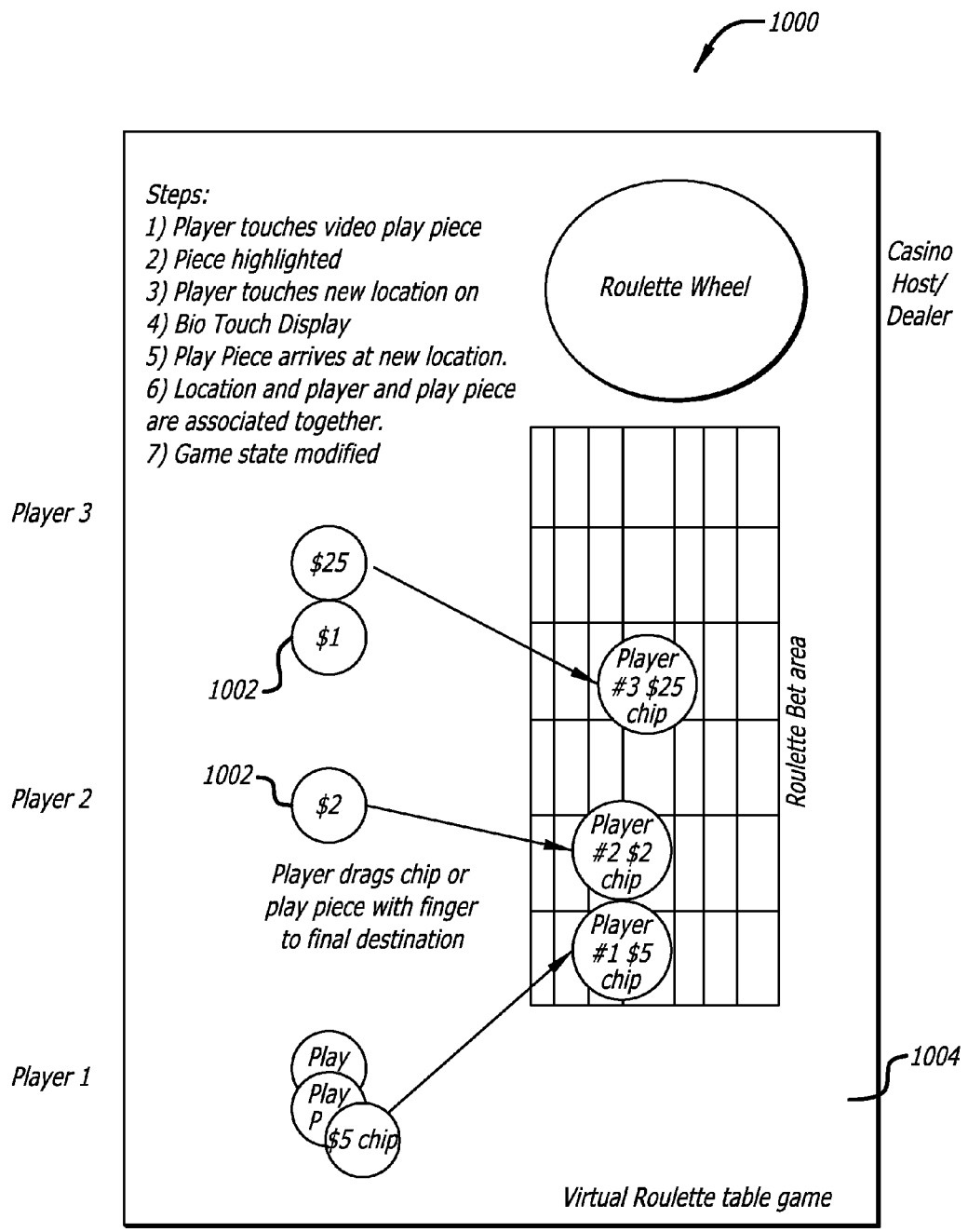
FIG. 10 is a top view of a roulette gaming product incorporating a biometric input device.

FIG. 10 illustrates a virtual roulette table game 1000 presented on a surface computer. Each player would be able to move his/her virtual play pieces 1002 or game chips into the desired bet area on the video roulette table. As a player moves a piece 1002 from one coordinate to another on the roulette table, the biometric touch screen 1004 scans one or more fingerprints (handprint and/or palm print) of the player moving the game piece. The captured fingerprint is then compared to prior biometric samples. An association is made for this player and his/her play pieces. With this approach, each player can simultaneously move their wagers around on the table and re-assign them to new bet locations. Only authorized players or the dealer will be able to move the play pieces which are owned by that player. An attempted move by another player with another fingerprint scan would be unable to move the pieces. In one embodiment, each play piece has its associated piece identifier, piece type, biometric fingerprint identifier ID, location ID, patron ID (if known), and any associated game transaction ID.

While FIG. 10 depicts a virtual roulette table, other embodiments include a virtual poker table, blackjack table, baccarat table, or craps table. In these various embodiments, multiple players may be able to play simultaneously and the biometric touch screen device may track and move each player's game pieces.

FIG. 11 is a process flowchart of a player-initiated event on a gaming device or player tracking display that has a biometric touch screen. The player-initiated events include, but are not limited to, game play, a wagering event, a winning outcome, a losing outcome, a bonus event, a cash out event, a request for help, a skill-based game event, a player choice, a play piece movement, a funds transfer event (to or from gaming device), a ticket print event, a change denomination event, a change game event, a change number of lines event, a change game combo event, a change wager size event, acceptance of an offer, a gaming device reconfiguration/download request by a patron. The fingerprint scan captured on the biometric touch screen that originally triggered the event is stored and associated with the event. The biometric association of a fingerprint to a gaming device event or player tracking event provides an audit trail of events and permits the linking of different game events to an anonymous player fingerprint scan taken by the biometric touch screen device.

The capture and use of the biometric data provides player tracking for a player who has never officially registered with the casino's player club and created a patron account ID. Accordingly, the biometric touch screen allows a casino to track and market to players who are not members of a player's club. As those skilled in the art will appreciate, the biometric touch screen may be implemented with other player tracking systems of identified players or patrons.

An undisclosed capture of biometric information may be used in a cash-out event. When a player presses the cash out button on a biometric touch screen, a fingerprint is also scanned. If the scanned fingerprint matches a fingerprint in the biometric database, then the funds can be cashed out. In one embodiment, the cashed out funds may be automatically sent to the player patron account. In another embodiment, the player is given cash out options such as "Print ticket or Save to account." In one embodiment, the Gaming Standards Association (GSA) G2S WAT class or SAS AFT functions could move the player funds to and from the player account automatically or in response to a player's choice.

In another embodiment, a player may elect to move their game credits/cash from gaming device to gaming device by using only their fingerprint with optional PIN identification, thereby eliminating the need for vouchers or tickets. If a scanned fingerprint is not found in a biometric database, then a regular cash out bar-coded ticket can be printed. In one embodiment, the ticket may have the image of the fingerprint.

In another embodiment, data representing a fingerprint may also be printed on a ticket to provide additional security in the event the ticket is lost or verify the owner of the ticket. When the ticket is redeemed, the patron would be required to provide a fingerprint scan for a second time. If this second scan or associated scan data matches the biometric data or scan on the ticket, then the conversion to cash or cash value would be allowed. Accordingly, only the correct person could redeem the ticket at a gaming device, a kiosk, a cashier, the players club desk, a lottery office, or a retail outlet. The biometric input device (such as a biometric touch screen) allows an anonymous player to transfer funds from an account associated with his fingerprint. As a result, the player does not need a player's club card to use a fund transfer feature. Additionally, the biometric input device and the use of biometric data allows for the transfer of cash, credit, bonus cash, bonus credits, bonus points, or restricted credits from gaming device to gaming device even without a player account. Optionally, an anonymous player may be asked to enter a personal identification number (PIN) to further secure these transactions.

In another embodiment, the biometric data may be used to verify a jackpot pay event. Biometric data that was captured when the player initiated the game event is compared to a subsequent capture of biometric data from the player. If the two scans match (within appropriate thresholds), then the hand pay is allowed to be given to the patron. By requiring a fingerprint scan for a hand pay, the patron is able to collect the hand pay at a later time and is required to wait for an attendant to pay the win.

As those skilled in the art will appreciate, the thresholds for "matching" biometric samples may be configured by casino personnel at an administration console. A particular level of tolerance or variance may be established to consider to samples to be "matching." For example, a matching fingerprint may be set to require approximately 99% of the key fingerprint data points to match an approved or previously stored biometric fingerprint sample.

Additionally, different business transactions in the casino may have different match thresholds. For example, a hand pay or funds transfer may require a higher level of matching of fingerprint scans whereas restoring a game state would require a lower level of matching. It is also contemplated that certain transactions types may require other unique identifiers to complete the transaction. For example, a PIN and a fingerprint scan may be required to authorize a funds transfer.

FIG. 12 is a process flowchart illustrating multiple players interacting (e.g., select, modify, and move) with their respective play pieces on a common biometric touch screen. The players may simultaneously play on the same biometric touch screen device and compete against each other, a casino, or hosting entity. The play pieces, the biometric identity of their respective owner, and the play piece properties, and the location of the play pieces may be tracked by the game state processor and/or associated gaming processors. The play pieces can be any video rendered element in a game such as, but not limited to, play cards in a deck of cards, casino wagering chips, virtual player cards, credits, bonus points, games pieces in a casino related table game, video game pieces, home board game pieces, game characters, weapons, player games selections, prizes.

When a player purchases virtual tokens from the dealer or through funds transfer from the player account, the player's biometric fingerprint sample is associated with each new chip issued to the player. These chips would appear in the player's chip area. Because the player's biometric fingerprint sample is associated with the chips, the player (and a casino administrator) are only allowed to the move the chips on the biometric touch screen.

Referring back to FIG. 10, a player would be able to select one of his chips and drag the selected chip to a location on the Roulette bet area. This chip would be identified with the player ID and/or the player's fingerprint scan. The chip would also be assigned to this location ID or specific bet number or cell on the roulette bet area. Multiple players could simultaneously move their play pieces to the same bet number or location and the system would be able to track each person's individual bets.

In another embodiment, a play piece is selected when a player touches a desired play piece. Once the player touches the play piece, a first biometric sample is taken from the player. The player may touch a new location for the selected play piece on the game surface. A second biometric sample is taken from the player at the new location. If the processor matches the first and second biometric fingerprint scans, the play piece moves to the new location. If the first and second biometric fingerprint scans do not match, the play piece will not move. Otherwise stated, non-approved players will be blocked from moving pieces since their biometric fingerprint scan is not authorized for the play piece.

The biometric touch screen allows for simultaneous movement of each player's pieces without each player taking turns. The selection, movement, and modification of each player's play piece are tracked and authorized by using the fingerprint scan to associate the specific player with the specific play piece. If two or more players' play pieces are in the same vicinity or cell on the play surface and one player touches the biometric touch screen, then the player's play pieces can be highlighted and selected for action or modification based upon verification of his fingerprint scan. The play pieces from other player's would not be selected because the biometric scan does not match those pieces.

On a multi-player game presented on the same biometric touch screen, a game processor or a gaming server tracks the entire play field, each play piece and its associated biometric fingerprint scan or player ID, and the location ID of the play piece. This can aid in the continuation of play after a malfunction, close of game session, or game state recovery from a previous session. In one embodiment, all of the players' play pieces, the game ID, the session ID, the tournament ID, and other game object data are stored in a Save State server. Optionally, a casino patron ID may also be associated with this Save State data. The Save State data is also associated with the biometric fingerprint sample of the player taken by the biometric touch screen.

In order to recover game state, the player only has to apply his finger to the biometric touch screen. The fingerprint would be scanned and if associated play pieces and other game data are found in the Save State server or CMP/CMS server, then this data is sent to the gaming device for processing and display. The gaming device processor application has the ability to recover game state with the Save State data. The play pieces are then rendered on this gaming device and the session is allowed to continue at this time on this gaming device.

The biometric touch screen allows for most traditional, turn-based games to be played simultaneous by multiple players on the same playfield. The game state processor can keep track of all moves, changes of all play pieces for each player as they occur. simultaneously. Each play piece is associated with the fingerprint biometric sample and the processors can track every change or change request for each player and their associated play pieces. A whole new genre of board style, table games, and other games can now be produced using this biometric touch screen. These games may be played on various surface computer display devices. The devices may be located at a player's home as well as location-based entertainment facilities.

FIG. 13 is a flowchart of a player pressing a gaming cabinet button panel button having an integrated biometric input device. The biometric input device are reconfigurable gaming cabinet buttons capable of presenting different graphic and/or words describing the button's different functions. Additionally, the biometric input device is also capable of obtaining a biometric sample from a player. Generally, the biometric input device needs to be physically depressed by the player or employee to trigger the event on the game device or player tracking panel. In one embodiment, the biometric input device only needs to be touched to trigger the desired event. A biometric scan is also taken at the time the button is touched or depressed.

The reconfigurable button may be, but are not limited to, cash out button, wager button, max bet button, change denomination button, change # lines button, change game button, service request, poker buttons, spin buttons, or the like. In yet another embodiment, the button may be a physical, non-reconfigurable button having a biometric input device.

Figure 14:
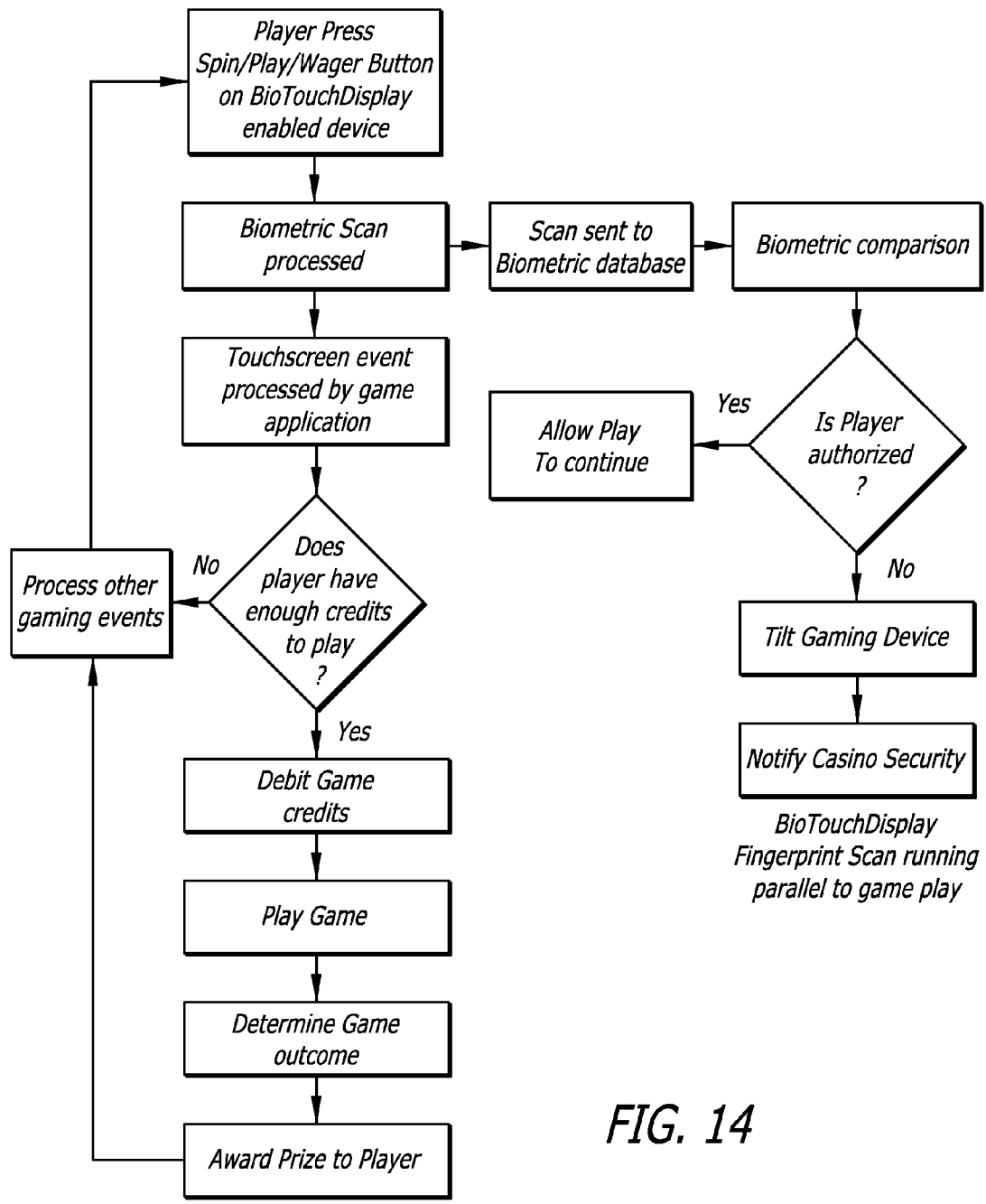
FIG. 14 is a flowchart of biometric authorization running in parallel with game play activity.

FIG. 14 is a flowchart showing the parallel execution of a biometric comparison scan and game play. The game software, OS software, and server software will operate as normal when a player commits a wager (e.g., by typically pressing the spin button, bet button, or max bet button). If the biometric comparison against an authorized biometric sample fails, the gaming device is tilted and casino staff is notified. This technique works well for wireless gaming devices issued to authorized casino patrons. If another patron or person attempts to use the device, then the gaming is blocked. This acts as tool in player age verification processes to ensure that underage and unauthorized players are not allowed to play on the gaming device. In this parallel configuration, game play is not blocked until the biometric scan associated with a particular game function is determined to be unauthorized.

In another embodiment, a biometric scan is not required for each function or action carried out by a player. Rather, once a player has been authorized on a gaming device, play on the gaming device is allowed for this player for predetermined period of time. Alternatively, play is allowable for a certain amount of wagers, number of games, a random number of games, or a random amount of time. This allows the biometric fingerprint scan to be used intermittently as a way to recognize and reauthorize a player. If an authorized biometric fingerprint is not detected prior to the end of the predetermined period, the gaming device is tilted. Optionally, casino security personnel is also notified of the tilted gaming device. In another embodiment, a successful facial recognition scan may be used in lieu of the fingerprint scan taken on a biometric input device.

Figure 15:
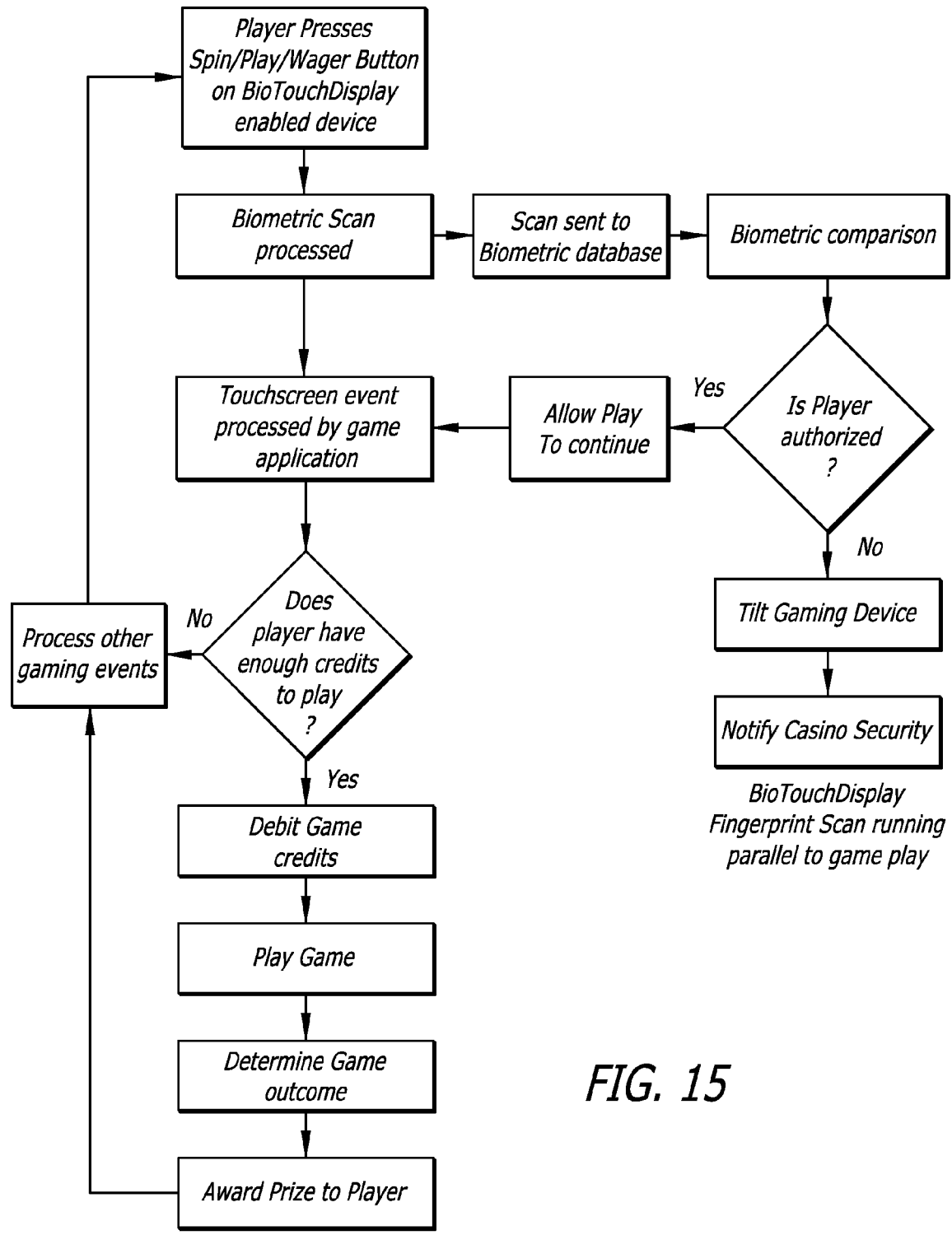
FIG. 15 is a flowchart of biometric authorization running in series with game play activity.

FIG. 15 is a flowchart showing the serial execution of a biometric comparison scan and game play. Upon commitment of a wager by a player, a fingerprint scan is obtained by the biometric input device. The scan is compared against authorized fingerprints that is stored in the gaming device, an associated processor, or at the biometric comparison server. Game play processes are only executed if there is a successful match of biometric samples. Otherwise, the gaming device is tilted and game play is blocked. Optionally, casino staff are notified upon a tilt condition. In one embodiment, a message is presented on one or more displays of the gaming device that play has been suspended due to unauthorized play.

This technique works well for wireless gaming devices issued to authorized casino patrons. If another patron or person attempts to use the device then the gaming is blocked. This acts as tool in player age verification processes to ensure that underage and unauthorized players are not allowed to play on the gaming device. In this serial configuration, game play cannot occur until such a fingerprint scan can be determined to be authorized.

When a biometric comparison is a one-to-one type, then the process can occur very quickly. The response time between wager commit and biometric validation may be as little as a tenth of one second. This 1 to 1 biometric comparison can occur when another player-specific identifier (e.g., a player's club card number or account login name) is used in addition to the fingerprint scan. The card number or account name is sent to the server with the recently captured fingerprint scan. The server quickly looks up the authorized scans associated with this card number and then compares the new scans to the authorized scans. As those skilled in the art will appreciate, other unique player identifiers can be used in lieu of the player's patron card number.

In other embodiments, authorized scans are located at the gaming device, the gaming server upon where the game is played, player tracking display device, or GMU device. By localizing the authorized scans, comparisons between a recently obtained and an authorized sample may be quickly carried out as compared to sending the scan to a central server for comparison. Additionally, the localized scan may be carried out faster because the recent scan is only compared to a small subset of authorized biometric scans rather than a whole database of biometric scans. In this embodiment, the client side processor can do the compare and match with software executing on the device. A first or periodic scan may have to be compared to the central biometric database to authorize play or use of gaming device features. Subsequent fingerprint scans would only have to be compared to this first sample taken that was authorized. This comparison/match process can occur in the client side processor or on a server that has previously associated this first scan with this client device ID or session ID. Thus, a 1 to 1 fast compare is achieved with or without the unique other player identifier.

In an alternate embodiment, a pin hole camera and facial recognition software can also identify an authorized gamer and allow play on the gaming device. This technology does not require a player to take any action to play the gaming device other than present his face in the field of view of the camera. If the player leaves the field of view, the player is notified that the gaming device will become disabled unless the facial recognition software can re-identify the authorized player.

Figure 16:
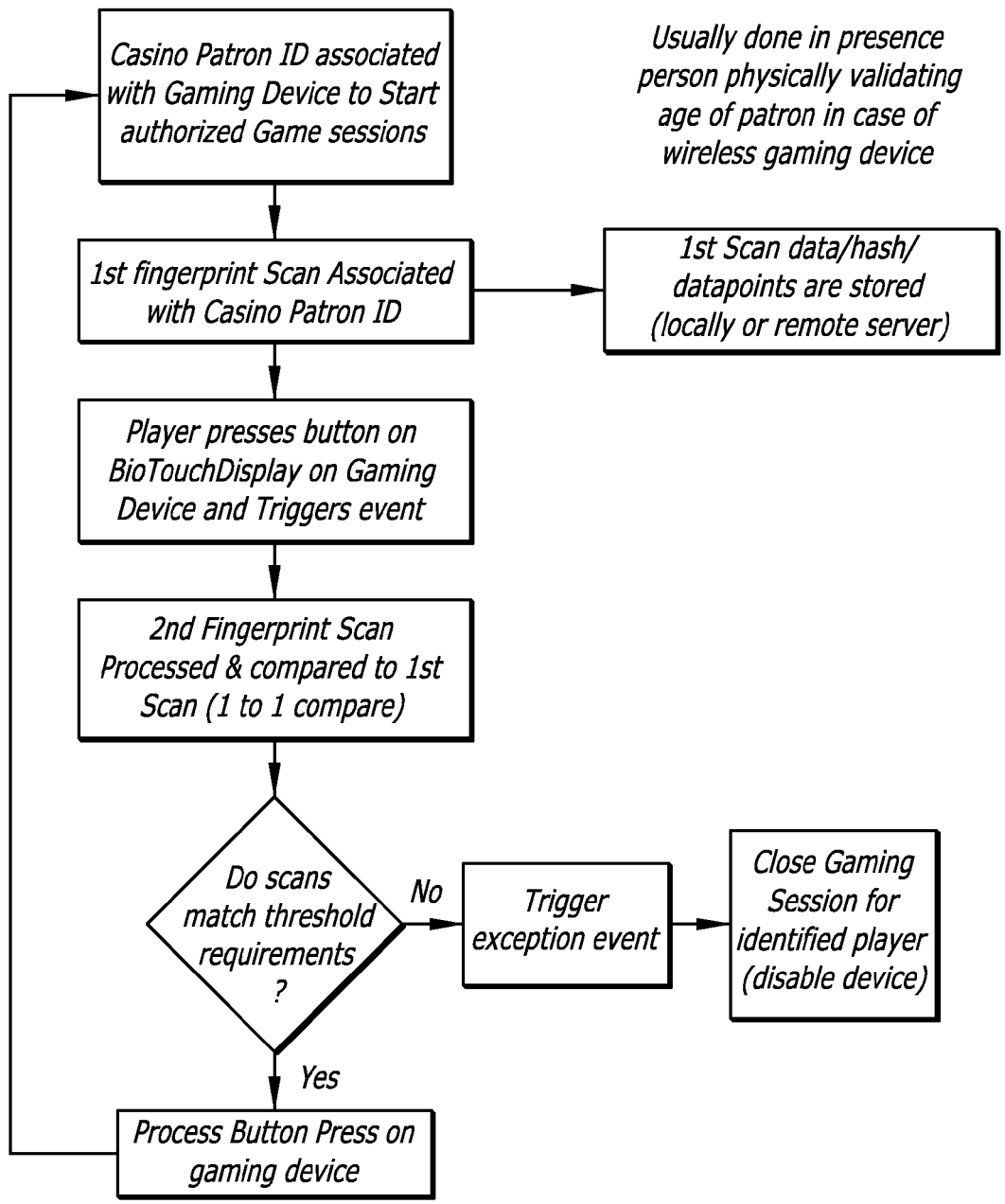
FIG. 16 is a flowchart of another method of biometric authorization on a gaming device.

FIG. 16 is a flowchart of assigning a casino patron to a gaming device. A first fingerprint scan is taken of the casino patron. The scan or scan representative data is stored in memory device on a server, on the gaming device memory, or its associated memory. The authorized fingerprint scan may be taken at a kiosk, gaming device, cashier, player club desk, or the like. During game play, the player activates a biometric input device on the gaming device. A second fingerprint scan is taken and is compared to the first stored biometric scan. If the scans do not match, then an exception is triggered and the gaming session on the gaming device is closed. The gaming device is tilted and further play is blocked. If the first and second scans match, then the button press is authorized and processed as normal. The user is considered an authorized user of the gaming device. The association of an authorized Patron ID, a gaming device ID, and authorized fingerprints captured by using a biometric input device enable an age verification and player verification system for a gaming device.

Some non-limiting examples of the gaming device with integrated biometric input device may include a wireless gaming device, a cellular phone device, an Apple iPHONE, a PDA device, a home game console, a personal computer, a casino player tracking panel (e.g., Bally Gaming's iVIEW), a casino electronic gaming machine (EGM), an arcade gaming machine, or a surface computer gaming device.

Figure 17:
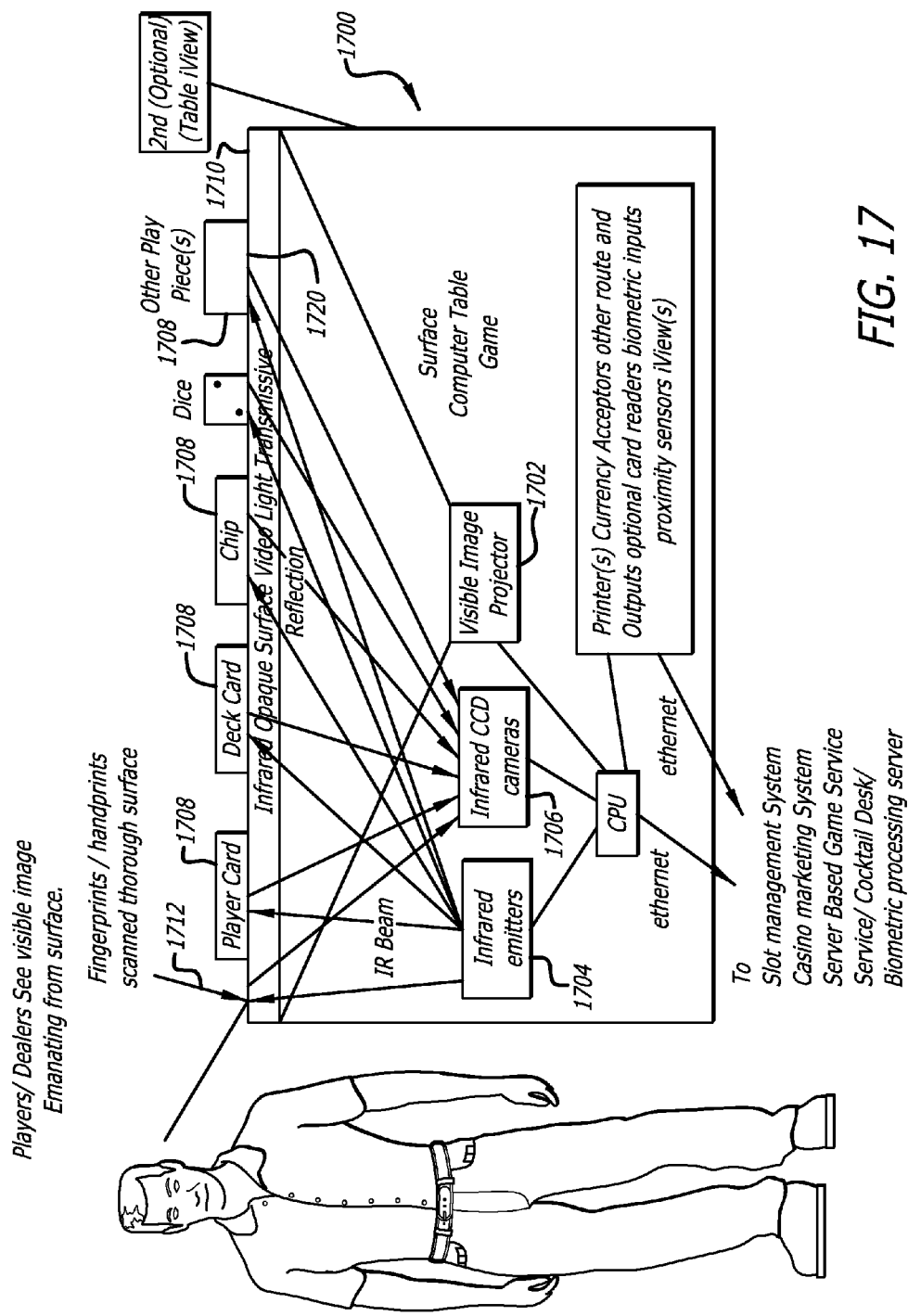
FIG. 17 is a side view of a surface computer gaming device.

FIG. 17 is a side view of a surface computing device 1700 with a visible image projection device 1702, emitters 1704 and detectors to scan for objects 1708, gestures, fingers 1712, fingerprints, play pieces 1708, and hands 1712 on the surface 1710. The infrared or CCD cameras 1706 below the surface of the device 1700 is able to capture the fingerprint/handprint image when it is in contact with the surface. The device 1700 is also able to see various player hand gestures that can be used as an input device to affect the data shown on the display surface. The handprint/fingerprint image scanned by this form of the biometric touch screen 1720 is processed and compared with other biometric samples as previously described.

In another embodiment, a traditional table game has a zone/seat associated with each player. A biometric touch screen allows a player to freely move around the surface and just by pressing his/her finger on the touch screen. The entire player account and play pieces can be moved to this new coordinate if the fingerprint matches an associated one in the biometric comparison processor. This technology allows the player the freedom to move around the touchscreen table or surface computer and still allow the play pieces, game session, game state, game credits, player account, and bonusing to be associated with this player at this new zone/seat location.

In one embodiment, a biometric processing system is associated with an electronic gaming machine and one or more of the following devices: a networked gaming system including, a host computer, one or more gaming machines connected to the host computer, each of the gaming machines including a biometric touch screen device, each gaming machine including a transmitter to transmit the digitized biometric image to the host computer; the host computer including one or more databases with archived biometric data and associated action instructions; the host computer including a digitized image comparator for comparing received digitized biometric images with the archived biometric data; in the event of a match, the host computer transmitting a signal based on the associated action instructions.

In another embodiment, the gaming machine is re-configured, re-skinned, and optionally downloaded to based upon the anonymous identification data achieved using the integrated biometric touch screen display device. An anonymous unidentified player would not know that a biometric fingerprint image is captured by the integrated biometric touch screen display device. The offer engines, advertising servers, download and configuration system, Casino Management Systems (CMP/CMS) and SMS/SDS slot systems, Bonusing servers can be all integrated and may determine and set the gaming machine configuration specific to this anonymous biometric sample taken. The unique biometric sample taken can be linked to a Casino Management System anonymous account record. This CMS/CMP account will track past game play history from multiple sessions and user preferences. This anonymous account record is created solely with the anonymous biometric data as a unique identifier of a player. No user name, address, contract info or player demographic data is collected prior to the biometric scan occurring at the gaming device. In effect a unique player ID has been created in the CMP/CMS player tracking databases even though the player has never taken positive action to register at a players' club desk or kiosk.

Advertisements and offers are tracked and associated with the biometric sample taken on the biometric input device. As a person moves from device to device and touches the biometric input device, the systems can re-identify the user and link to other advertisements that were seen, offered, and/or accepted by the user. Advertisements, offers, and bonuses may be modified based upon this fingerprint scan profile. Certain non-limiting examples include an advertisement or offer that has been shown to a person previously would not be shown again to this player, an offer that was previously accepted would not be shown to this user again, or a bonus that was already given to this user would not be given again.

In one embodiment, the gaming software runs at the server and is reconfigured or downloaded at the Server Based Gaming server based upon identification of an anonymous player. The presentation layer and the user interface may be provided to the player through a gaming portal, browser based gaming device, a smart client gaming client, or a thin client gaming device. These server-based or server-supported game systems have the outcome determined at the server. The player is notified at the client user interface of any winning outcomes. The player can select the wager size at the client user interface device via a button deck, mouse, keyboard, or biometric touch screen.

In one embodiment, the fingerprint biometric scan data (raw or hashed) can be sent to the biometric application server/database for comparison to the biometric hashes, patterns, or images stored there within. If the comparison fails, then the systems will create a new anonymous biometric account ID in the CMS/CMP server associated with this biometric hash. Player rating, bonusing, and other features would then occur for this newly identified player as outlined in this disclosure. If the comparison is successful, then the anonymous play session for this EGM is now linked to the previous anonymous player account.

In an embodiment, advertising or game offers are shown and are viewable on the gaming device display to a player or an observer who touched the integrated biometric touch screen device associated with an EGM. These advertisements and game offers are controlled by the demographics of the person being identified by the biometric scan. These offers will encourage a player to play by giving the player the types of games that are typically preferred by this demographic group. Normal advertisements and offers could be shown when it is determined by the system components or gaming machine that there is no player actively with the gaming device. Non-limiting examples of no player activity include, but are not limited to, no button presses for a period of time, no credits on gaming machine, no player card in gaming device, no touch screen presses for a period of time, or the like. When an integrated biometric touch screen device is touched by a person, a simultaneous fingerprint scan is taken. This scan processed locally by one processor in the gaming device for the key points detailing in the fingerprint image. The key point data is sent to a server for comparison to other known or biometric scans. Alternatively, the entire scan can be sent to the biometric comparison server. If a scan match is found, then a determination is made if there is an associated casino patron player account associated with the biometric fingerprint scan. If so, the advertising and offers are modified in real-time for this biometrically identified casino patron. If a biometric match is found, but there is no casino patron account associated with the scan, then the advertisements, game offers, and other offers shown to the player can be modified in real-time for a returning non-casino patron. These offers and advertisements may be further modified by previous historical play, advertisements seen, offers accepted, and other casino financial activities done by the person with this biometric fingerprint.

These embodiments allow the player to sit down at a gaming machine without identifying himself by using a player card or other identification means. These embodiments subsequently further allow the player to be subsequently re-identified for a play session by anonymous identification means using the integrated biometric touch screen device. The gaming machine then can be reconfigured into a mode appropriate for this anonymous player. Better games, different games, different game combos, player preferred games, the game that the player is luckiest on, recently played games, and so on can be configured, re-skinned or themed, or downloaded to the gaming device or Server based gaming engine once such anonymous identification is achieved. The player may be notified of such changes on the video screen or the reconfiguration may take place without notification to the player. Such devices, systems, and methods allow a player-centric reconfigurable gaming system, device, and methods even though the player has not previously and in person created a named player patron account in a traditional casino player tracking system.

In one embodiment, the player may anonymously and biometrically identify himself with the integrated biometric touch screen LCD display device. Once this scan is compared to the anonymous player database of other biometric scans and its associated unique player tracking database record, the gaming device can be re-configured, re-skinned, or downloaded to player preferences from a previously saved game state. Player session rating and bonusing would occur for this anonymous player based solely on this unique biometric sample and the newly reconfigured gaming device. In this embodiment, the player takes a positive action to scan his fingerprint on the fingerprint reader. The player would be notified that biometric identification will provide the player with a better bonus and gaming experience, thereby compelling or inducing a player to provide a biometric sample. The player would still be anonymous to any systems in the sense that the player name, address, and contact information is not known to the central CMP/CMS player tracking system. Only the biometric scan/hash is stored for this session and linked to the same scan/hash from previous game sessions for the purpose of bonusing and automatic game reconfiguration and/or download. The gaming session would end when the machines credits are set to zero, the player cashes out, or there is inactivity on the gaming device for a period of time.

This anonymous biometric scan is useful to the patron because the patron can remain anonymous, but the patron gets the benefit his past history of play, his player preferences, and demographic profile. For tax reasons and other privacy reasons, the player may not want to have a player tracking card that associates all gaming sessions' wagers and wins together. Different state lottery or other government commissions or regulators may want to allow the player centric-reconfigurable gaming and bonusing systems, but they do not want to have player database due to the Freedom of Information Act. That is, a player's name and wager/win/loss data could become known to the public through the press or private citizens who request the data through the Freedom of Information Act. The anonymous identification of the player allows for the state lottery to deliver a reconfigurable gaming system competitive to the private gaming properties such as in the Class III Nevada jurisdiction.

In one embodiment, the casino may notice a new anonymous player is playing a gaming device from the scan taken by the integrated biometric touch screen LCD display. Dispatch software would notify casino club desk employees that this new anonymous patron is playing at a particular gaming device. The casino can then send out an employee to greet the new patron and issue a traditional player card to the anonymous patron. The player card number and the biometric scan data are uniquely associated together in the database so that the patron may use either one or both of the player card or biometric scan. Either way the player session data is maintained for this player spanning multiple sessions independent of how the player was identified.

In one embodiment, a responsible gaming system, method, and device are disclosed. A player may be provided a user interface at a gaming machine, kiosk, player's club desk or other registration device or site to configure gaming self-exclusion rules for their fingerprint biometric scan(s) pattern or hash. A player's fingerprint scan can be taken by a traditional finger print reader or the integrated biometric touch screen display at this user interface device. The player may set up the gambling limits including, but not limited to, wager limits, win/loss limits, loss rate per unit time limits, time on device (session time) limits. In other embodiments, these limits may be jurisdictionally set. As a result, the player can only view the limits configured for this jurisdiction and the current player advancement towards these limits. In another embodiment, a player can also set self-imposed threshold limits under the state or jurisdictional required limits. The player can also set the expire rules for these self-imposed limits. For example, a player may set an expire rule of no more than $500 of wagering in two hours of time, otherwise subsequent gaming is blocked. The wager limit may expire after a preset amount of time of non-wagering by the player. This forms the basis for a player to self-exclude himself from gambling if these limits are reached. If the non-identified player begins a play session at a gaming device and/or the player's biometric pattern is matched to the central biometric database, the jurisdictional and the self exclusion limits are checked. If the player has reached any of the self-exclude limits, then the play on the gaming device is blocked. In one embodiment, one or more of the bill acceptor, ticket acceptor, coin acceptor, electronic funds transfers are all blocked from use on this gaming device. The player will be cashed out and a ticket will be printed for any remaining credits on the gaming device. The player will be notified of the limit being reached on the gaming device screen or player tracking display (iVIEW) on the gaming device. Once the expire rules have occurred on these limits play can resume on this or another gaming machine in this and other properties configured in this system.

In another embodiment, the responsible gaming system may also be used with a traditionally identified patron who has chosen to not play with the player's club card. The player's club card account number and a fingerprint biometric scan data are previously associated together at a kiosk or terminal at the player club desk. Whenever the player uses one or both identification means (club card or biometric sample) then the session wager win/loss data is monitored. When the responsible gaming limits are reached by this player then play is blocked as previously disclosed. Expire rules would clear these limits automatically and wagering could resume.

In still another embodiment, various jurisdictions may impose responsible gaming limits. An anonymous player would not go and set up his or her self-imposed limits. When the responsible gaming systems, biometric touch screen devices, or biometric identity systems isolate a player who has crossed these responsible gaming limits, game play is blocked automatically at any game device. Once the state or jurisdictional limits expire, game play is then allowed again.

In one embodiment, a money laundering detection system is disclosed herein. In the context of gaming, money laundering can occur when money from illicit sources (drugs, mob, FBI or treasury marked money, or forgeries) is cleaned through the gaming machine. For example, the gaming machine can take this dirty money in to its currency acceptor and converted into an electronic credit. The electronic credit may be subsequently cashed out, and a ticket or cash/coin dispenser would issue clean money or ticket to the player.

In order to prevent money laundering, currency input devices and their associated gaming devices can be monitored for out-of-bounds conditions. An out-of-bounds condition may be a certain amount of money has been credited onto a gaming device, and the player cashes out after a few games of insignificant wager amounts. These out-of-bounds conditions can be configured by central systems. Gaming machines or their currency acceptors are monitored for these out-of-bounds conditions being triggered. This determination can be done by the gaming device, its attached system components (GMU, iVIEW), or a central out-of-bounds checking servers. A fingerprint is scanned by the biometric input device prior to an out-of-bounds condition or once an out-of-bounds condition has been determined. The fingerprint is then recorded with the out-of-bounds event in the system. Alternatively, the biometric input device captures the fingerprint from each anonymous player who presses the wager or collect button. This data can be stored in a database for later retrieval and also provides an audit trail for security personal or authorities. The fingerprint biometric data or image scanned is stored with the out-of-bounds data of recent credits, wagers, cash outs on the gaming device. Alerts may be sent to security personnel or law enforcement authorities in response to an out-of-bounds transaction. Optionally, the gaming machine may present a Notification of out-of-bounds activity on one or more displays of the gaming machine. The biometric scan can be compared to others patterns in the out of bounds database and linked together.

In this embodiment, the biometric touch screen can anonymously scan the player of the electronic game machine, and biometric data can be sent to the out-of-bounds server to see if there were any previous out-of-bounds conditions reached for this biometric pattern. Once a certain amount of these out-of-bounds events have occurred in total or in a specific amount of time on the same or different gaming machines, authorities would be notified of suspicious activity. Optionally, the biometric data would be provided to these authorities for prosecution purposes.

In still another embodiment, each gaming device would have a biometric touch screen device with the gaming device. This system would enable security personnel, auditors, regulators, authorities to monitor all individuals gaming at any specific gaming machine in a single property or a group of gaming locations. Each wager, win, loss, cash out, funds transfer to or from a player account, or other activity can be monitored and linked to the fingerprint of the player who selected the particular activity. For example, the fingerprint image or biometric sample of the person who committed the wager on a game and won a jackpot can be stored for later reference and validation of the player who actually triggered the jackpot. This would solve disputes those disputes in which two or more players claim to have won a jackpot.

In another embodiment, a surveillance system may be integrated with the Game Monitoring Unit or iVIEW contained within the gaming device. The surveillance system may be triggered in response to biometric scans when certain metered events (not limited to jackpots, out of bounds conditions, wagers, cash outs, denomination changes, changes to selected games) are triggered on the gaming device. Casino Security personnel can use this to data to compare against a database of banned players. If a banned player is found at a gaming device, then play can be blocked on the gaming device by sending a disable command to the gaming device. Security staff can be sent to the specific patron out of the property or turn the patron over to the authorities. A biometric touch screen system that is tied into the gaming device gives the casino security staff an additional 2000 plus devices to look for banned players on a traditionally sized casino floor. In smaller locations that can not afford a surveillance system, the embedded biometric touch screen systems provide the ability to audit gaming transactions, patrons playing on gaming machines, and biometric information of individuals who may have gained access to the interior of the gaming device.

In one embodiment, access into the gaming cabinet can be blocked unless the fingerprint pattern is matched against a known approved person database. The electronic locks on the gaming device would then be unlocked.

This fingerprint system can be used to aid in age verification of the player playing the gaming device. This system can also be integrated into wireless gaming devices that are traditionally handheld. The biometric input devices can also be integrated into in-room gaming systems/devices to monitor age of a player of a gaming device in a hotel room. The television in the hotel room may be used as the display device for the gaming activity. A wireless handheld may be used to commit a wager or do other gaming related activity. This handheld may have an integrated biometric input device. Another example would be at poolside gaming device with integrated biometric touch screen. A series fingerprint samples are taken and stored of the player playing the gaming device upon each wager, each win, or other transactions on the gaming device. The surveillance/security staff can playback/review the fingerprint samples images of each game played one by one to ensure compliance with the casino rules, laws of the state, or other jurisdictional laws. This staff may also have an automated biometric comparison database to compare against authorized fingerprints/patrons. The surveillance/security staff can have be notified once the authorized fingerprint has changed. This would be to support an age verification process in a casino environment.

In various embodiments as an aid to maintain player privacy rights, the player must allow a first finger print scan to be taken at a kiosk, handheld gaming device, players' club desk, cashier cage, or other biometric scan device or location. This is typically in the presence of a human attendant who can witness the age of the person by visually validating the drivers license or other identification of said person. These biometric fingerprint scan(s) would be associated with a players club account ID. The player would also pre-authorize the capture of subsequent fingerprints prior to being allowed to play the gaming device (wireless device or traditional gaming device), or on a periodic sampling basis. A comparison of the first biometric scan and the subsequent scans at the gaming device would be compared for identification reasons. If the biometric scans do not match or the match thresholds are out-of-bounds, then play is blocked on the gaming device and/or security personnel are dispatched to the device to ensure age-compliant gaming.

The biometric input device also protects a casino patron who loses the wireless gaming device when it is logged into the players wager account. If another person tries to log onto this device or wager by pressing the wager button on the biometric input device, the device will not operate.

In still another embodiment, bonusing may be tied to the anonymous player. The Bally Power Winners system needs to know that an actual customer is playing the gaming device to qualify the player for entry into winner selection process in case the progressive is triggered at a random time. The biometric input device can be used to determine that a player is playing the gaming device and can be added to the pool of eligible winners. If the progressive triggers and this player is determined to be eligible to win, then this player represented by the unique biometric identifier can be entered into the pool of possible winners of the progressive. One or more of these biometric identifiers in the qualified to win group are chosen randomly to win the progressive or a consolation prize. Then the prize can be given to the player at the gaming device through an automatic funds transfer (AFT) to the credit meter or a cash ticket can be printed at the gaming device. A player may have to re-scan his finger to collect the prize award. The fingerprint scan of the patron who won the progressive or other jackpot can be printed on the cash voucher, which allows for later validation of the prize or the identity of the winner to ensure that the award is given to the proper person.

An anonymous player who has been re-identified as a return player, or of a return player of certain patron level or status based upon past play history can be bonused or "comp'd" (i.e., compensated) based upon this patron level or historical play. A non-limiting example is where a Power Winners progressive is configured for anonymous players who have played over $500 of wagers in the last month. If any of those players sit down and wager in front of the gaming device and the biometric touch screen system and the CMP/CMS system determines this player meets the progressive criteria, the player is then qualified for entry into this progressive bonus in the event the progressive bonus is triggered.

In one embodiment, once a fingerprint of any sort is scanned and credits are put on the gaming machine, a metered session is started on the gaming device or within the CMP/CMS system. All gaming machine meters are monitored and include, but are not limited to wagers, wins, losses, deposits, and cash outs. The biometric scan (e.g., fingerprint, handprint, palm print) is taken of the player. Once the biometric recognition system has identified the biometric sample against the anonymous player database, the accrued session data is linked to the central CMS/CMP player rating database. As a result, the anonymous player gets the entire benefit of the bonusing the instant he starts playing even if they haven't been identified by the anonymous player identification system for a minute or two. After a period of gaming or touch screen inactivity, the gaming session concludes.

The player can later register at a player's club desk for a real account by providing identification like a driver's license and a fingerprint scan. This new scan will be compared to the database of biometric scans of anonymous players. If a match is found, then any bonusing earned to date will be assigned to this newly created patron ID account, and the anonymously generated comp data and previous play history will be assigned to this specific patron. The patron may then be given a player card to identify oneself for later player sessions at the EGM's. The fingerprint recognition system may then only have to do a one-to-one match of the player card to fingerprint recognition data. This is a much quicker look up versus a one to many look up of fingerprint samples to the multitude of anonymous players' fingerprint/biometric data.

There are player-initiated scans and non-player initiated scans. A player-initiated scan requires the user to knowingly start the scan process by taking an action and using the biometric touch screen. On-screen prompts are shown to the player to place a finger or hand in the proper orientation to re-authorize and/or re-identify the player. In one embodiment, a spin button on the biometric touch screen may take a fingerprint scan of the player with each wager. Alternatively, a max bet button may also take a fingerprint scan. With each spin or play of the game, the identification of the player can occur whether the player is using a player card or not. In yet another embodiment, the player may be unaware that a biometric scan is being taken during one or more of the following events: play of the game, funds transfer to/from the game, cash out from the game, jackpot win, out-of-bounds gaming, or other conditions.

It is contemplated that bonusing products offered and sold by Bally Gaming, Inc. may utilized the biometric touch screen and the anonymous player database. An anonymous player can be "comp'd" (i.e., compensated) and bonused in the same ways as if the person had actually registered for a casino patron ID card account and used this card at the gaming device. The anonymous player will earn his/her Live Rewards bonus games and Play Points on iVIEW the same way he/she would if he/she was a traditionally registered patron of a casino and using the players club card. The anonymous player can move from gaming device to gaming device and his/her virtual or anonymous CMP/CMS patron account can move with this player. In one embodiment, the comp's or bonuses accrue over multiple play session once the facial recognition system determines that the player in the current gaming session is the same player in previous sessions.

In one embodiment, anonymous players can be grouped into different club levels. For example silver, gold and platinum club levels are traditionally defined for casino registered patrons who hold a magnetic stripe patron card. Players who reach these certain club level status are given extra or different bonusing based upon these club levels. The anonymous players may also be linked into these same or different club levels, with or without the anonymous player's knowledge. An anonymous player may advance from one club level to the next based upon wagering activity in a single or multiple gaming sessions. Bonusing provided to the anonymous player may be further modified by the gaming device being played. One or more features of the gaming device that may effect the bonusing include, but are not limited to, EGM ID, selected denomination, game ID, game combo ID, location, zone of the floor, the country-state-or local jurisdiction of the gaming machine, the property ID, the group of gaming machines this machine belongs, geographic location, IP address, or other players playing on the same gaming machine. The bonusing rates for anonymously identified players can be configured by casino personnel in the CMP/CMS player tracking servers.

In still another embodiment, an anonymous player may save a game state or save a bonus state. Game state features that may be saved include game specific settings, levels, objects, XML data, and/or game variables can be saved in a database for an anonymous player. In one embodiment, the fingerprint biometric sample scanned by the BioTouchDisplay or its biometric hash creates a primary key in a database. These game variables can be saved to the save state server as the player cashes out of the gaming device or leaves the gaming device as determined by a camera or other proximity detectors. The player can also elect to save game state data manually. The saved data may then be referenced to the fingerprint recognition pattern or hash code. The game state would be then saved for this player against this biometric sample or hash.

The player would be able to return to the same or a different gaming device, touch the biometric input device, and the game would be reconfigured into back into the state at the end of the previous gaming session. In one embodiment, the player may be asked whether the player wants to reconfigure the game machine to a previous game state. The game state data would allow for complete recovery of the game state even though the player is a non-identified player. This game state recovery data would be sent to the client device or server process running the game for the client. This allows the player to remain anonymous to the casino or site but still have the ability to use the save state capability. This feature would also work for anonymous wireless devices and portal based gaming sites. There are player initiated scans and non-player initiated scans that can be used for this save game state/recover game state purpose.

A fingerprint sample from the biometric input device can be taken of a person who played a tournament game as a means of identifying the anonymous player later at award collection time. This person's tournament score can be stored in the leader board for this tournament and associated with the anonymous biometric sample. If the anonymous player sees his score won a tournament prize, the player can go to the tournament prize redemption center and collect his prize so long as the current biometric scan matches the scan associated with the tournament prize and score.

The tournament player may also be given a tournament score receipt voucher with or without the scan data, scan hash, or image of the player on printed on the voucher. In another embodiment, the image of the winning player would be stored in a central prize database. The player could redeem the voucher for the prize if the attendant determines that the person redeeming the voucher is the person whose picture is on file who earlier posted the tournament score.

In another embodiment, the anonymous person may return to the gaming device and have their fingerprint scanned by the biometric input device to determine if there are any winning tournaments, raffles, bingo games, lottery winnings associated with his biometric sample. If so, the player can collect the prize at the gaming device or a kiosk terminal. Accordingly, a prize may be redeemed by an anonymous player who purchased or was freely given an entry into a game that awards prizes after a player concludes his gaming session. The anonymous player fingerprint biometric sample that is scanned before, during, or after the game is associated with the tournament score entry, lottery numbers or any other unique identifier for the game being played. The anonymous player can redeem for the prize with the biometric sample only or in conjunction with other identification means including, but not limited to, a voucher with tournament scores, game entry number, raffle numbers, lottery numbers, sweepstakes numbers, and the like printed on a voucher.

In one embodiment, multiple unique players may be identified by touching the BioTouchDisplay on the same gaming device or player tracking display. Multiple CMP/CMS player rating sessions would be automatically created for these unique fingerprint scans taken by the BioTouchDisplay. Players may be instructed to only use one finger as they interface with the BioTouchDisplay. This way more than one person can interact with their play pieces and player account just by touching the screen. The software can then clearly identify who is doing what action on the screen without the players self-governing themselves or taking turns. Unless allowed, a player would not be able to interact with another player's play pieces or player account data on the same screen.

In one embodiment, the fingerprint scan captured by the biometric touch display is rotated, scaled or otherwise modified to aid in the comparison against other biometric samples.

In one non-limiting embodiment, the fingerprint scan captured by the biometric touch display is processed by client side processing software by the M2SYS corporation. The M2SYS Bio-PlugIn™ software is used to do this processing. Central biometric registries in the casino or third party biometric registries may conduct a comparison of a recently taken scan against a previous scan. Alternatively, the scan may be compared to a biometric sample that is stored in a casino patrons Personal Digital Key (PDK) (FOB or player/employee wireless smart card) as part of a complete wireless proximity detection system. A wireless comparison match may take place between the PDK and the sample taken on the BioTouchDisplay. There are a multitude of certified biometric fingerprint analysis and comparison software packages commercially available and all are considered to be within the scope of this disclosure.

In one embodiment, an abandoned card is determined using the traditional player card reader and a GMU. If wagers have not occurred for a period of time, the GMU creates an abandoned card transaction. The card reader and iVIEW display show that an abandoned card event has occurred. If the patron leaves the gaming device with the player card still in the card reader, then a lost card has occurred. Another player may come to this same gaming machine and re-insert this player card in an attempt to use this player card as his own. The biometric touchscreen scans the players fingerprint and compare to a fingerprint scan of the authorized patron for this player card. If the scan doesn't match then an event can be sent to security staff. The fraudulent player wouldn't even know the biometric fingerprint is taken by the Biometric touch display system. The gaming device could be disabled and player tracking session closed if the comparison fails. The record of this fraudulent use and the fingerprints can be used as an audit record and be provided to security staff or authorities to aid in prevention and prosecution of fraudulent player card use.

In one embodiment, the biometric touch screen is integrated into the iVIEW device present across all gaming devices on the casino floor. The general principles of operation are as follows:

1. An anonymous play session will be defined as the time which the gaming device is credited until the gaming device is either cashed-out or the credit meter reaches zero. If the biometric fingerprint data cannot be acquired by a biometric touch screen, the session will not be created. In alternate embodiments, the player session starts once a player touches the biometric touch screen input device.
2. A player's anonymous record will be created based upon the first receipt of unique biometric data by the CMS. Subsequent play sessions will be matched based upon the biometric data. The results of the subsequent sessions will be linked to the player's master record. Each session will be tracked uniquely but it will be possible to roll-up all activity over a given time period for a given player.

In principle, the basic flow of information will be as follows:

1. The biometric device will identify the player at the point the device being played is credited in some fashion. This occurs at cashless transfer to/from the gaming device.
2. The binary representation of the player as defined by the biometric device in use will be transmitted to the system interface present in the game. This device is commonly known as a Game Monitoring Unit (GMU).
3. The GMU will transmit the data to the back of house CMS. The data will be flagged with the fact this is an anonymous player identification rather than a standard player tracking message using a card.
4. The CMS will create a new player master record if it is the first time the biometric data has been exposed to the system. A new play session will be created and linked to the master player record.
5. Periodic updates to the play session may be sent to the CMS if desired based on system configuration
6. When the player cashes out or the credit meter on the device reaches zero, the play session will be closed. The final results of the session will be transmitted to the CMS.
7. Final results for the play session will be stored in the CMS database. It will be possible to retrieve those results at a later time via tracking reports or on the CMS user interface.

The demonstration this technology consists of the following:

1. The acquisition of the player's biometric identity at the gaming device using a biometric touch screen device.
2. The creation of the player's anonymous record in the CMS/CMP.
3. The accumulation of the player's activities during play on the gaming device.
4. The termination of the anonymous session upon player cashout or when the gaming device credit meter reaches zero or a period of gaming machine inactivity or the biometric identity is no longer available or read by the biometric reader.
5. The creation of additional play sessions for the anonymous player at a second gaming device (or by adding credits to the original gaming device).
6. Linking first and second play sessions to the same anonymous record in the CMS/CMP.
7. Review of activity via reporting or user interface on the CMS In an embodiment multiple, finger print scans or hashes can be associated together with a casino patron account number. As a result, a patron is allowed to use any finger on biometric touch screen and the casino patron can be identified. This requires a registration process where a user registers approved fingers against his/her patron club account number. This can be done at a kiosk, cashier cage, casino club desk, player tracking biometric touch screen, EGM biometric touch screen, or handheld gaming device biometric touch screen.

The player would first identify the player patron account entering a players club card or card number into device. A PIN may be required prior to association of fingerprints with the players patron account. Anonymous players may also associate their multiple fingers/hand prints together even without a players club account. A player could enter a PIN, username, and/or other data then have multiple fingers/hands scanned by the biometric touch screen. These fingerprints/hand prints are then associated with the unique PIN, username or other confidential information to the anonymous player. Multiple different people and their fingerprints/handprints can be associated together into anonymous accounts or casino patron accounts. This way any person with approved fingers/hands can use the product or service and be authorized to play the gaming device, do funds transfer, be "comp'd" (i.e., compensated), gain access to hotel rooms, as if they were the same person. Multiple people effectively become one as they use the products or services of the casino.

The foregoing describes a biometric touch screen device capable of simultaneously capturing a fingerprint scan, a touch event, and presenting a computer rendered display. All of these features can be combined into an integrated semiconductor device such as the Sharp technologies device shown in FIG. 7A. Alternatively, traditional touch screen input devices can be modified to add the biometric fingerprint scan required to implement the features described in this disclosure. Some non-limiting example technologies include, but are not limited to, Surface Acoustic waves, infrared camera fingerprint scans through a surface computer projected display, pressure sensitive scans, an optical field scan, infrared light beams or acoustic waves on or above the surface of the touch screen substrate, thermal scans, ultrasonic scans, infrared scans, laser scans of fingerprint. Most of these technologies would allow the video data to be seen through the touch sensor/fingerprint reader. In some cases, the touch screen sensor and the fingerprint scanner may be separate technologies integrated in close proximity to each other with the LCD or projection display. In some instances, the touch screen/fingerprint scanner or reader can be integrated and be behind the video display membrane or LCD. Some portions of the entire display screen may be processed for the fingerprints, which would speed up biometric processing.

Effectively any integrated technology or combination of technologies to provide touch screen, fingerprint/handprint, and computer graphics display in an integrated form factor would be considered within the scope of this disclosure. If the fingerprint/handprint reader is in the same area as the display device then this would be within the scope of this disclosure.

In one embodiment, different areas on the biometric touch screen can require different level of fingerprint scans/authorizations. For example, a spin button on the biometric touch screen may not need a good scan taken each touch. In contrast, a cashout button may require the user to give a good fingerprint scan each time for audit reasons. Each button or user selectable area on the biometric touch screen may have different requirements for biometric scan and analysis. This aids in the processing speed of the entire system. Only important scans need to be fully processed. Each application, each button, each window on the biometric touch screen, or the associated OS driving the application can be configured to allow this selective biometric scan/process.

In another embodiment, the biometric touch screen or the separate fingerprint reader scan can be combined with a facial recognition scan to isolate a specific patron better than using any technology alone. Each biometric technology matches key data points to get to a recognizable pattern. If multiple biometric systems are used then a match with a joint data set can be made and one can get a significantly higher chance of a match to a specific person. For example, in normal biometric scans, the casino would require eight points of match on a fingerprint scan to one in a database. Alternatively, ten points of match on a face scan may be required to pass a threshold test to uniquely identify the user. If two biometric systems are combined together, these thresholds or points of match may be reduced for each individually. If the system can get six points of match on a fingerprint scan and six points of match on the face scan, then the person can be uniquely identified using these combined but lower thresholds than using each biometric system separately.

In another embodiment, the use of a facial recognition system could be improved if the distance to the subject were known by the analysis software to better enable calculations of the absolute size measurements. This could be accomplished with a directional proximity detector, thermal sensor, ultrasonic range detector, laser or IR range detector or other range detection technology. Also, multiple cameras can be used to provide a stereoscopic vision system. Multiple cameras would provide both a distance measurement and multiple simultaneous views for point matching on the face, thereby improving the chances of a positive facial match against known facial patterns. When the key datapoints and triangles are being isolated on different face scans then the range data provided would help in the determination of the triangle sizes and datapoints. Simple geometry calculations using this range to the person would allow for a better/quicker biometric processing of the face being acquired.

In any of the embodiments, multiple scans may be taken of the fingerprint or facial scan to aid in the comparison and match process. Often, an imperfect fingerprint scan is acquired where certain key data points are captured in a first scan and other key data points are missing. In a second scan taken during the same touch screen press or on a subsequent biometric touch screen press, other key data points are captured. The points of commonality are matched together between the two scans and the unique points are combined into a complete scan with enough data points to do a match. There may be rules that say enough good data points must be collected within a certain number of presses or scans or the authentication of the user will fail. The gaming device may have game play blocked until a new good scan and match occurs. In a non-limiting example each press on the spin button/funds transfer button/collect button on the BioTouchDisplay may not be required to be authenticated, but rather the combination of multiple scans may be analyzed to create a total view of the combined biometric samples. This combined total view may be used to validate and match a user to a previously known biometric sample or patron ID.

In the embodiments described above, a user may have to press the biometric touch screen for a long enough period of time to get a good biometric scan of the fingerprint and to trigger the user's desired event. The software would decide if enough data points are found to make the biometric determination, comparison, or match. Once this determination is made the user interface may show the user that a good scan has occurred. The good scan may then be sent to a client or server side processing engine for comparison matching against other biometric sample or just for event/transaction logging purposes. The user may be requested to orientate his/her finger/hand/face in a certain direction to aid in the biometric scan process.

While the example embodiments have been described with relation to a gaming environment, it will be appreciated that the above concepts can also be used in various non-gaming environments. For example, such rewards can be used in conjunction with purchasing products, e.g., gasoline or groceries, associated with vending machines, used with mobile devices or any other form of electronic communications. Accordingly, the disclosure should not be limited strictly to gaming casino's, arcades, portal based game sites, cellular phone devices, personal digital assistant devices, laptops, personal computers, home game consoles, bar top gaming devices, table gaming devices, surface computing devices, table gaming biometric touch screen, television gaming, or in-room gaming devices.

The foregoing description, for purposes of explanation, uses specific nomenclature and formula to provide a thorough understanding of the disclosure. It should be apparent to those of skill in the art that the specific details are not required in order to practice the disclosure. The embodiments have been chosen and described to best explain the principles of the disclosure and its practical application, thereby enabling others of skill in the art to utilize the disclosure, and various embodiments with various modifications as are suited to the particular use contemplated. Thus, the foregoing disclosure is not intended to be exhaustive or to limit the disclosure to the precise forms disclosed, and those of skill in the art recognize that many modifications and variations are possible in view of the above teachings.

One of ordinary skill in the art will appreciate that not all gaming devices have all these components and may have other components in addition to, or in lieu of, those components mentioned here. Furthermore, while these components are viewed and described separately, various components may be integrated into a single unit in some embodiments.

What is claimed is:

1. A method for providing verification on a gaming device, the method comprising:
capturing, by an input device on a first gaming device, a first biometric sample of a player at the first gaming device without knowledge of the player;
establishing game session data corresponding to a gaming session;

providing, by the first gaming device, game play to a player of the first gaming device;

associating, by a processor, the captured first biometric sample with the established game session data;

storing, by the processor, the captured first biometric sample and the established game session data in memory;

capturing, by an input device on a second gaming device, a second biometric sample at the second gaming device without knowledge of the player;

verifying, by the processor, that the first and second biometric samples match;

configuring the second gaming device based on the established game session data corresponding to the gaming session on the first gaming device;

receiving, by a cashout input device, a cashout request from the player at the first or second gaming device;

capturing, by the cashout input device, a biometric sample without knowledge of the player;

determining, by the gaming device, that the biometric sample captured by the cashout input device corresponds to the player associated with the first or second biometric sample; and based on the determination that the biometric sample captured by the cashout input device corresponds to the player associated with the first or second biometric sample cashing out the player.

2. The method of claim 1, wherein the first and second biometric samples are fingerprints, retinal scan, iris scan, or any combination thereof.

3. The method of claim 1, wherein the first biometric sample is captured on a touch screen or a player-actuated button.

4. The method of claim 1, wherein the game session data is a game configuration, game play preference, game state, accumulated game pieces, bonus points, bonus game pieces, bonus awards, accrued player tracking points, or any combination thereof.

5. The method of claim 1, wherein the first gaming device and the second gaming device are the same.

6. The method of claim 5, wherein the first biometric sample and the game session data are stored on the first gaming device.

7. The method of claim 1, wherein the first biometric sample and the game session data are stored on a server in communication with the first gaming device.

8. The method of claim 1, wherein reconfiguring the second gaming device further comprises downloading one or more programs for execution the second gaming device.

9. The method of claim 1, wherein the first and second biometric samples are verified according to a first threshold associated with reconfiguration that is different from a second threshold not associated with reconfiguration.

10. The method of claim 1, further comprising establishing one or more gaming limits set by the player.

11. The method of claim 10, further comprising associating the one or more gaming limits with biometric information of the player.

12. The method of claim 11, further comprising reaching the one or more gaming limits.

13. The method of claim 12, further comprising disabling game play on the first or second gaming device upon the one or more gaming limits being reached.

14. The method of claim 13, further comprising notifying the player that the one or more gaming limits have been reached.

15. The method of claim 13, further comprising notifying the player of when game play will be enabled.

16. The method of claim 13, further comprising cashing out remaining credits on the first or second gaming device without player input.

17. The method of claim 13, further comprising enabling game play on the first or second gaming device after expiration of the disabled game play.

18. The method of claim 1, wherein the first biometric sample is captured on an input device of the gaming device that has a function unrelated to the capture of the first biometric sample.

19. The method of claim 1, wherein cashing out the player based on the determination that the biometric sample captured by the cashout input device corresponds to the player associated with the first or second biometric sample comprises transferring game credits from the first gaming device to the second gaming device.

20. The method of claim 1, further comprising modifying advertisements, offers, and bonuses presented to the player based on the first or second biometric sample.

21. The method of claim 1, further comprising:
monitoring the first or second gaming device for an out-of-bounds condition;
receiving, by the gaming device, a cashout request from the player after inputting a predefined amount of money into the first or second gaming device and after wagering an insignificant amount for a predefined number of games;
receiving the out-of-bounds condition; and
recording the out-of-bounds condition with the first or second biometric sample.

* * * * *

UNITED STATES PATENT AND TRADEMARK OFFICE
CERTIFICATE OF CORRECTION

PATENT NO.         : 8,972,299 B2
APPLICATION NO.    : 12/350190
DATED              : March 3, 2015
INVENTOR(S)        : Bryan M. Kelly It is certified that error appears in the above-identified patent and that said Letters Patent is hereby corrected as shown below:

Title Page, item (12), replace "Kelley" with --Kelly--

Title Page, item (75), replace "Kelley" with --Kelly--

Title Page, item (57), line 4, replace "verifying" with --verify--

In the Specification

Column 6, In line 9, after "is" insert --in--

Column 6, In line 26, after "can" insert --be--

Column 12, In line 20, after "consider" delete "to"

Column 13, In line 11, replace "player's" with --players'--

Column 13, In line 13, replace "are" with --is--

Column 13, In line 17, replace "player's" with --players'--

Column 14, In line 4, add --s-- to "button"

Column 17, In line 34, replace "actively" with --activity--

Column 19, In line 61, replace "converted" with --convert--

Column 20, In line 56, after "this" delete "to"

Signed and Sealed this
Eighth Day of September, 2015

Michelle K. Lee
*Director of the United States Patent and Trademark Office*

CERTIFICATE OF CORRECTION (continued)
U.S. Pat. No. 8,972,299 B2

Column 21, In line 27, after "can" delete "have"

Column 21, In line 37, replace "players" with --players'--

Column 21, In line 50, replace "players" with --player's--

Column 22, In line 65, replace "utilized" with --utilize--

Column 23, In line 52, after "reconfigured" delete "into"

Column 26, In line 20, insert --.-- after "CMS"